(12) United States Patent
Inomoto

(10) Patent No.: US 12,742,952 B2
(45) Date of Patent: Sep. 22, 2026

(54) ZOOM LENS AND IMAGE PICKUP APPARATUS

(71) Applicant: CANON KABUSHIKI KAISHA, Tokyo (JP)

(72) Inventor: Yu Inomoto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 18/628,959

(22) Filed: Apr. 8, 2024

(65) Prior Publication Data

US 2024/0255741 A1 Aug. 1, 2024

Related U.S. Application Data

(63) Continuation of application No. PCT/JP2022/007185, filed on Feb. 22, 2022.

(30) Foreign Application Priority Data

Nov. 15, 2021 (JP) ................................ 2021-185712

(51) Int. Cl.
*G02B 15/14* (2006.01)
*G02B 15/163* (2006.01)

(52) U.S. Cl.
CPC ....... *G02B 15/1451* (2019.08); *G02B 15/163* (2013.01)

(58) Field of Classification Search
CPC .......................... G02B 15/1451; G02B 15/163
See application file for complete search history.

(56) References Cited

U.S. PATENT DOCUMENTS 9,264,638 B2 2/2016 Inomoto
9,268,120 B2 2/2016 Inomoto
9,291,800 B2 3/2016 Inomoto
(Continued)

FOREIGN PATENT DOCUMENTS

JP H05-215966 A 8/1993
JP H6-109976 A 4/1994
(Continued)

OTHER PUBLICATIONS

JP 2013221976 A (Imoto yu) machine translation (Year: 2013).*
(Continued)

*Primary Examiner* — James A Dudek
(74) *Attorney, Agent, or Firm* — Carter, DeLuca & Farrell LLP

(57) ABSTRACT

A zoom lens includes, in order from an object side to an image side, a first positive lens unit fixed for zooming, a second negative lens unit that moves during zooming, at least two lens units that move during zooming, a final positive lens unit disposed closest to an image plane and fixed for zooming, and an aperture stop disposed between a lens surface closest to the image plane of the second lens unit and a lens surface closest to an object of the final lens unit, configured to move during zooming, and located closer to the image plane at a telephoto end than at a wide-angle end. The first lens unit includes a sub-lens unit disposed closest to the object in the first lens unit and fixed for focusing, and a sub-lens unit configured to move for focusing. Predetermined inequalities are satisfied.

10 Claims, 12 Drawing Sheets

(56) References Cited

U.S. PATENT DOCUMENTS

| | | | |
|---|---|---|---|
| 9,310,592 | B2 | 4/2016 | Inomoto |
| 9,715,092 | B2 | 7/2017 | Inomoto |
| 10,338,359 | B2 | 7/2019 | Inomoto |
| 10,678,031 | B2 | 6/2020 | Inomoto |
| 11,294,156 | B2 | 4/2022 | Inomoto |
| 2023/0350168 | A1 | 11/2023 | Inomoto |
| 2023/0350173 | A1 | 11/2023 | Inomoto |

FOREIGN PATENT DOCUMENTS

| | | | |
|---|---|---|---|
| JP | H07-140386 | A | 6/1995 |
| JP | 2001-318315 | A | 11/2001 |
| JP | 2004-341237 | A | 12/2004 |
| JP | 2009-042346 | A | 2/2009 |
| JP | 2012-058660 | A | 3/2012 |
| JP | 2013-221976 | A | 10/2013 |
| JP | 2013-221999 | A | 10/2013 |
| JP | 57-32176 | B2 | 6/2015 |
| JP | 2016-014816 | A | 1/2016 |
| JP | 2017-058590 | A | 3/2017 |
| JP | 2017-078770 | A | 4/2017 |

OTHER PUBLICATIONS

Notice of Reasons for Refusal issued by the Japanese Patent Office on Sep. 30, 2025 in corresponding JP Patent Application No. 2021-185712, with English translation.

International Report on Patentability issued in corresponding International Application No. PCT/JP2022/007185, dated May 2, 2024, pp. 1-7, English Translation.

Notice of Reasons for Refusal issued by the Japanese Patent Office on Jan. 20, 2026 in corresponding JP Patent Application No. 2021-185712.

International Search Report issued by the Japan Patent Office on Apr. 26, 2022 in corresponding International Application No. PCT/JP2022/007185, with English translation.

* cited by examiner e
g
C
F
M S
Fno= 2.3
ω= 32.4°
ω= 32.4°
ω= 32.4°
-0.400 0.400
SPHERICAL ABERRATION
-0.400 0.400
ASTIGMATISM
-5.000 5.000
DISTORTION (%)
-0.050 0.050
CHROMATIC ABERRATION

ZOOM LENS AND IMAGE PICKUP APPARATUS

CROSS-REFERENCE TO RELATED APPLICATIONS

This application is a Continuation of International Patent Application No. PCT/JP2022/007185, filed on Feb. 22, 2022, which claims the benefit of Japanese Patent Application No. 2021-185712, filed on Nov. 15, 2021, which is hereby incorporated by reference herein in their entirety.

BACKGROUND

Technical Field

One of the aspects of the embodiments relates to a zoom lens and an image pickup apparatus.

Description of Related Art

Zoom lenses for image pickup apparatuses such as television cameras, cinema cameras, digital still cameras, and video cameras are demanded to have a reduced size and weight, a wide angle of view, a high zoom ratio, and high optical performance. In addition, as the number of pixels in an image sensor mounted on an image pickup apparatus increases, the zoom lenses are demanded to have high resolution from the central portion to the peripheral portion of an image and little chromatic aberration.

Japanese Patent Laid-Open Nos. 2009-042346 and 2012-058660 disclose zoom lens each including, in order from the object side to the image side, a first lens unit having positive refractive power and fixed for zooming, a second lens unit having negative refractive power and providing zooming, a third lens unit having negative refractive power and providing image plane compensation, an aperture stop (diaphragm), and a final lens unit having positive refractive power and fixed for zooming. In these zoom lenses, the first lens unit includes, in order from the object side to the image side, a negative sub-lens unit 1*a*, a positive sub-lens unit 1*b*, and a positive sub-lens unit 1*c*. The sub-lens unit 1*b* moves for focusing.

In order to realize a zoom lens that has a reduced size and weight, and high optical performance, it is important to properly set a refractive power arrangement and select glass materials for a plurality of lens units in the zoom lens. However, a higher specification such as a larger aperture ratio and a higher zoom ratio in a compact and lightweight configuration has difficulty in achieving high optical performance in terms of various aberrations including longitudinal chromatic aberration and lateral chromatic aberration.

SUMMARY

A zoom lens according to one aspect of the disclosure includes, in order from an object side to an image side, a first lens unit having positive refractive power and fixed for zooming, a second lens unit having negative refractive power and configured to move during zooming, at least two lens units configured to move during zooming, a final lens unit having positive refractive power, disposed closest to an image plane, and fixed for zooming, and an aperture stop disposed between a lens surface closest to the image plane of the second lens unit and a lens surface closest to an object of the final lens unit, configured to move during zooming, and located closer to the image plane at a telephoto end than at a wide-angle end. The first lens unit includes a sub-lens unit disposed closest to the object in the first lens unit and fixed for focusing, and a sub-lens unit configured to move for focusing. The second lens unit includes a first negative lens closest to the object in the second lens unit, at least one negative lens other than the first negative lens, and at least one positive lens. The following inequalities are satisfied:

$$60 \leq \nu d21 \leq 105$$

$$30 \leq \nu d2Nave \leq 65$$

where νd21 is an Abbe number of a material of the first negative lens based on d-line, and νd2Nave is an average Abbe number of a material of the at least one negative lens other than the first negative lens in the second lens unit. An image pickup apparatus having the above zoom lens also constitutes another aspect of the disclosure.

Further features of the disclosure will become apparent from the following description of embodiments with reference to the attached drawings.

DESCRIPTION OF THE EMBODIMENTS

Referring now to the accompanying drawings, a detailed description will be given of examples according to the disclosure. FIGS. 1, 4, 7, 10, and 13 respectively illustrate the arrangement of lens units in an in-focus state on an object at infinity of the zoom lenses at a wide-angle end according to Examples 1, 2, 3, 4, and 5. The zoom lens according to each example is used for an image pickup apparatus such as a television broadcasting camera, a cinema camera, a general-purpose video camera, a digital still camera, or the like. Prior to a specific description of Examples 1 to 5, matters common to each embodiment will now be described.

In a zoom lens, a lens unit is a group of one or more lenses that move together during magnification variation (zooming) between the wide-angle end and telephoto end. That is, a distance between adjacent lens units changes during zooming. The lens unit may include an aperture stop. The wide-angle end and telephoto end correspond to the maximum angle of view (shortest focal length) and the minimum angle of view (longest focal length), respectively, when the lens unit that moves during zooming is located at both ends of a mechanically or controllably movable range on the optical axis.

Figure 1:
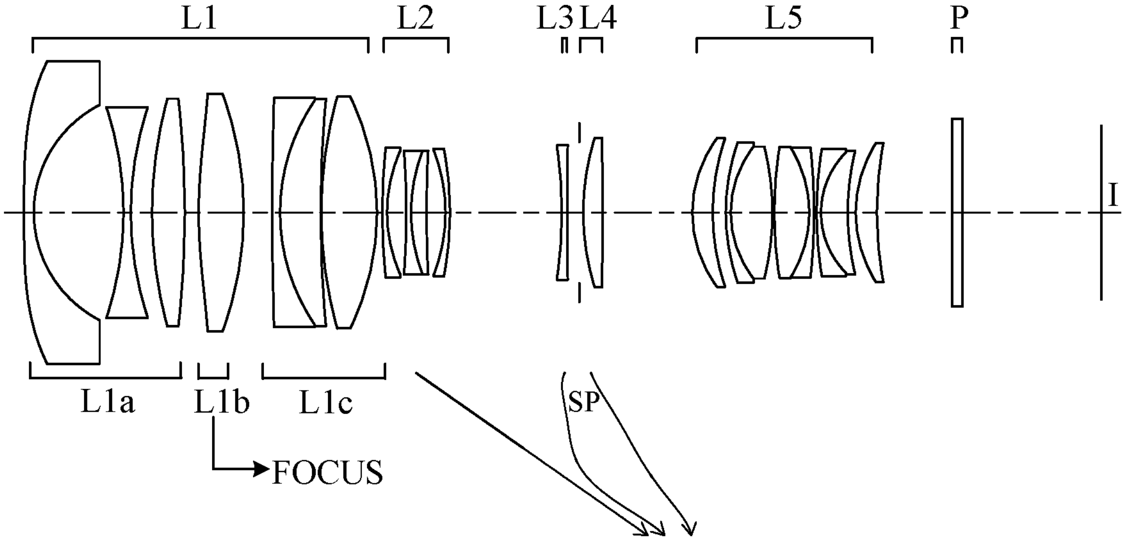
FIG. 1 is a sectional view of a zoom lens according to Example 1 (numerical example 1).

In each of FIGS. 1. 4, 7, 10, and 13, a left side is an object side (front side), and a right side is an image side (rear side). The zoom lens according to each example includes, in order from the object side to the image side, a first lens unit L1 having positive refractive power that is fixed (does not move) for zooming, a second lens unit L2 having negative refractive power that moves for zooming, two or more other lens units (L3, L4) that move during zooming, and a final lens unit (L5) having positive refractive power and disposed closest to the image plane. While each example illustrates a zoom lens that includes five lens units, the zoom lens may include six or more lens units. In the following description, a "lens unit having positive refractive power" and a "lens unit having negative refractive power" may sometimes simply be referred to as a "positive lens unit" and a "negative lens unit," respectively.

An imaging surface of a solid-state image sensor (photoelectric conversion element) provided in an image pickup apparatus or a film surface (photosensitive surface) of a silver film is disposed on an image plane I.

The zoom lens according to each example includes an aperture stop SP configured to move during zooming and disposed between a lens surface closest to the image plane of the second lens unit L2 and a lens surface closest to the object of the final lens unit.

In the zoom lens according to each example, the first lens unit L1 includes a first sub-lens unit (first partial lens unit) L1*a* disposed closest to the object of the first lens unit L1, and a second sub-lens unit (second partial lens unit) L1*b* disposed on the image side of the first sub-lens unit L1*a*. For focusing, the first sub-lens unit L1*a* is fixed and the second sub-lens unit L1*b* moves. The sub-lens unit is a group of one or more lenses that move together during focusing between an in-focus state (on an object) at infinity and an in-focus state (on an object) at a close distance. That is, a distance between adjacent sub-lens units changes during focusing.

The first lens unit L1 according to each example includes a third sub-lens unit L1*c* disposed on the image side of the second sub-lens unit L1*b*, and the third sub-lens unit L1*c* is fixed for focusing. Nevertheless, the third sub-lens unit L1*c* may be moved for focusing.

In each example, the second lens unit L2 includes a negative lens disposed closest to the object (hereinafter referred to as a first negative lens), at least one negative lens other than the first negative lens, and at least one positive lens.

The zoom lens according to each example satisfies the following inequalities (1) and (2):

$$60 \le \nu d21 \le 105 \quad (1)$$

$$30 \le \nu d2Nave \le 65$$

where νd21 is an Abbe number based on the d-line (wavelength 587.6 nm) of the first negative lens in the second lens unit L2, and νd2Nave is an average Abbe number based on the d-line of a negative lens or negative lenses other than the first negative lens in the second lens unit L2.

The Abbe number of a certain material is represented as follows:

$$\nu d = (Nd - 1)/(NF - NC)$$

where Nd, NF, and NC are refractive indexes of the d-line (587.6 nm), F-line (486.1 nm), and C-line (656.3 nm) in the Fraunhofer line.

Some conventional zoom lenses may include, in order from the object side to the image side, a first lens unit L1 having positive refractive power that is fixed for zooming, a second lens unit L2 having negative refractive power that moves for zooming, a third lens unit L3 having negative refractive power that provides image plane compensation during zooming, and a fourth lens unit L4 having positive refractive power. This zoom lens is generally beneficial to a reduced size and weight, and a high zoom ratio.

The zoom lens according to each example includes, in order from the object side to the image side, a first lens unit L1 having positive refractive power and fixed for zooming, a second lens unit L2 having negative refractive power that moves during zooming, a third lens unit L3 having negative refractive power that moves during zooming, a fourth lens unit L4 having positive refractive power that moves during zooming, and a fifth lens unit L5 having positive refractive power. This zoom lens can further achieve a smaller size and weight, a higher zoom ratio, and higher performance by having the larger number of lens units that move during zooming than that of the conventional zoom lenses.

In each example, the aperture stop SP described above can suppress an increase in the diameter of the first lens unit L1, and achieve the reduced size and weight and a high zoom ratio. In order to suppress the increase in the diameter of the first lens unit L1, it is important to dispose the aperture stop SP on the object side at the wide-angle end, thereby disposing the entrance pupil position closer to the object. On the other hand, in order to achieve a high zoom ratio, a sufficient moving amount of zoom moving unit such as the second lens unit L2 is to be secured, and for this purpose the aperture stop SP is to be moved closer to the image plane at the telephoto end. In other words, the aperture stop is located closer to the image plane at a telephoto end than at a wide-angle end.

Moving the second sub-lens unit L1*b* in the first lens unit L1 during focusing is a suitable configuration to provide the zoom lens with high optical performance and a reduced size and weight.

A description will now be given of inequalities (1) and (2). The second lens unit L2 moves as a main zoom unit during zooming from the wide-angle end to the telephoto end, and is a lens unit that makes the greatest contribution to a high zoom ratio. For this reason, it is important to select the optical material (glass material) of the lenses constituting the second lens unit L2, especially in order to suppress lateral chromatic aberration at the wide-angle end and longitudinal chromatic aberration at the telephoto end.

Figure 17:
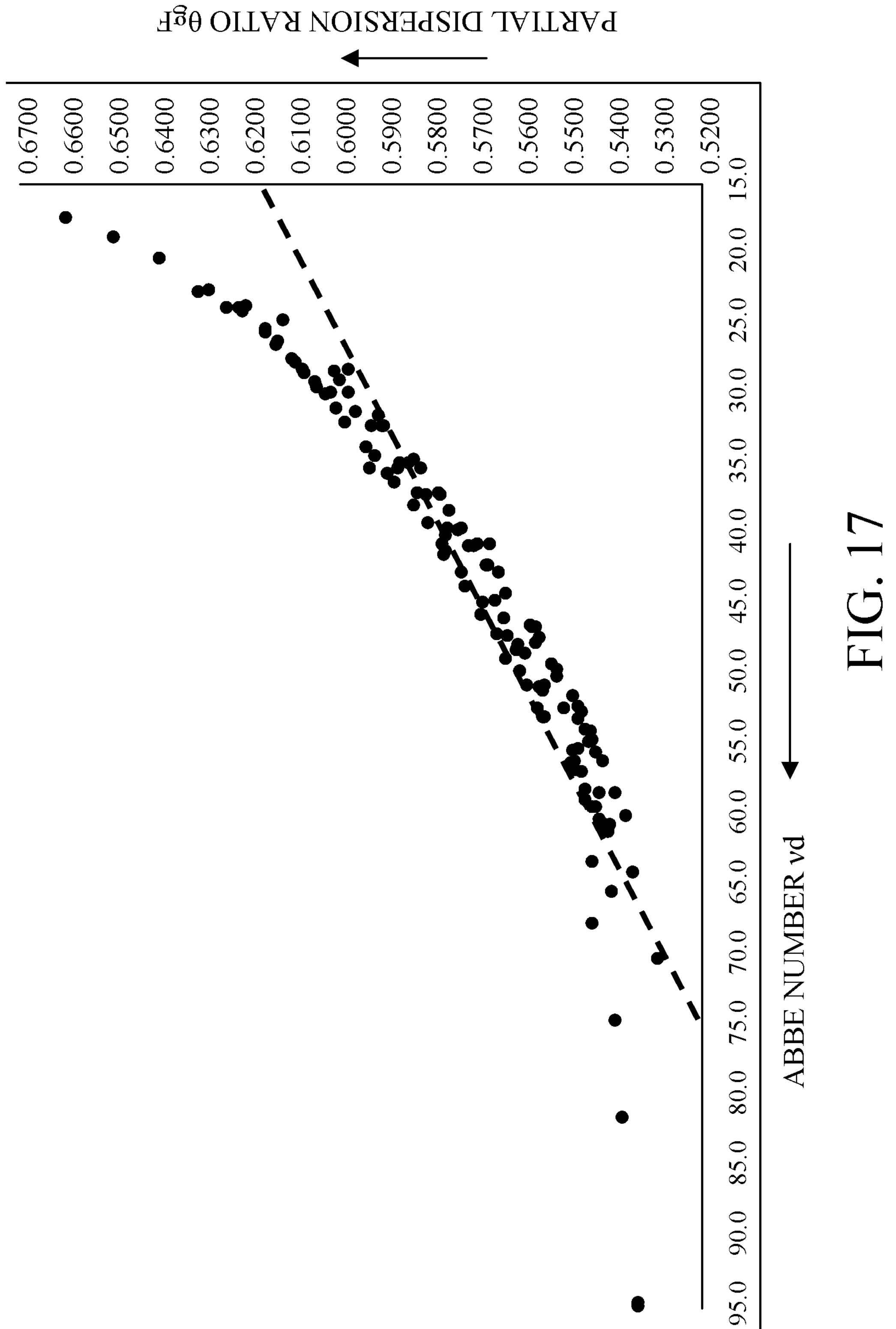
FIG. 17 illustrates the distribution of Abbe numbers ν and partial dispersion ratios θ of optical materials.

FIG. 17 illustrates an example of the Abbe number νd of the optical glass material and the partial dispersion ratio θgF for the g-line and the F-line. The partial dispersion ratio θgF is expressed as follows:

$$\theta gF = (Ng - NF)/(NF - NC)$$

where Ng is a refractive index for the g-line (wavelength 435.8 nm).

As understood from FIG. 17, when the Abbe number νd becomes 60 or more, the partial dispersion ratio θgF deviates from the straight line indicated by a broken line in the figure, and the anomalous dispersion tends to increase. Therefore, lateral chromatic aberration can be effectively suppressed at the wide-angle end by disposing the first negative lens made of the optical glass material that satisfies inequality (1) at a position closest to the object where the height of the off-axis principal ray from the optical axis is maximum at the wide-angle end in the second lens unit L2.

Inequality (1) defines a condition regarding the Abbe number of the material of the first negative lens. In a case where the Abbe number of the first negative lens becomes lower than the lower limit of inequality (1), lateral chromatic aberration at the wide-angle end increases and it becomes difficult to obtain high optical performance. In a case where the Abbe number of the first negative lens becomes higher than the upper limit of inequality (1), longitudinal chromatic aberration at the telephoto end increases and it becomes difficult to obtain high optical performance.

In addition, using the optical glass material that satisfies inequality (2) for the at least one negative lens other than the first negative lens in the second lens unit L2 can reduce lateral chromatic aberration at the wide-angle end and suppress longitudinal chromatic aberration at the telephoto end. Suppressing longitudinal chromatic aberration using the second lens unit L2 can reduce the burden of suppressing longitudinal chromatic aberration of the first lens unit L1 and the number of lenses in the first lens unit L1. This is also beneficial to the reduced size and weight.

Inequality (2) defines a condition regarding the average value of the Abbe number of the material of the at least one negative lens other than the first negative lens in the second lens unit L2. In a case where the average Abbe number becomes lower than the lower limit of inequality (2), lateral chromatic aberration at the wide-angle end increases and it becomes difficult to obtain high optical performance. In a case where the average Abbe number becomes higher than the upper limit of inequality (2), longitudinal chromatic aberration at the telephoto end increases and it becomes difficult to obtain high optical performance.

Due to the configuration satisfying inequalities (1) and (2), the zoom lens according to each example has high optical performance over the entire zoom range, a reduced size and weight, and a high zoom ratio.

The zoom lens according to each example may satisfy at least one of the following inequalities (3) to (5):

$$0 < \theta hF21 + 0.001 \times \nu d21 - 0.603 \tag{3}$$

$$1.5 \leq f21/f2 \leq 5.0 \tag{4}$$

$$\nu d2Pmin \leq 28 \tag{5}$$

In inequalities (3) to (5), θgF21 is a partial dispersion ratio of the material of the first negative lens of the second lens unit L2 for the g-line and F-line, f21 is a focal length of the first negative lens, and f2 is a focal length of the second lens unit L2. νd2Pmin is the smallest Abbe number among Abbe numbers based on the d-line of the materials of at least one positive lens included in the second lens unit L2.

Inequality (3) defines a condition regarding the partial dispersion ratio of the material of the first negative lens. Satisfying the condition regarding the partial dispersion ratio of inequality (3) in addition to the condition regarding the Abbe number of inequality (1) can easily achieve a smaller size and weight, a higher zoom ratio, and higher performance over the entire zoom range. In a case where the partial dispersion ratio of the first negative lens becomes so small that the value of inequality (3) becomes lower than the lower limit, the lateral chromatic aberration at the wide-angle end increases and it becomes difficult to obtain high optical performance.

Inequality (4) defines a condition regarding the relationship between the focal lengths of the first negative lens and the second lens unit L2. In a case where the focal length of the first negative lens becomes short so that f21/f2 becomes lower than the lower limit of inequality (4), various aberrations increase and it becomes difficult to obtain high optical performance. In a case where the focal length of the second lens unit L2 becomes long so that f21/f2 becomes lower than the lower limit of inequality (4), reducing the size and weight of the zoom lens becomes difficult. In a case where the focal length of the first negative lens becomes long so that f21/f2 becomes higher than the upper limit of inequality (4), lateral chromatic aberration at the wide-angle end increases and it becomes difficult to obtain high optical performance. In a case where the focal length of the second lens unit L2 becomes short so that f21/f2 becomes higher than the upper limit of inequality (4), various aberrations increase and it becomes difficult to obtain high optical performance.

Inequality (5) defines a condition regarding the minimum Abbe number of the positive lens or positive lenses included in the second lens unit L2. In a case where νd2Pmin becomes higher than the upper limit of inequality (5), longitudinal chromatic aberration at the telephoto end increases and it becomes difficult to obtain high optical performance.

Inequalities (1) to (5) may be replaced with the inequalities (1a) to (5a):

$$60 \leq \nu d21 \leq 100 \tag{1a}$$

$$35 \leq \nu d2Nave \leq 57 \tag{2a}$$

$$0 < \theta gF21 + 0.001 \times \nu d21 - 0.604 \tag{3a}$$

$$1.7 \leq f21/f2 \leq 4.2 \tag{4a}$$

$$\nu d2Pmin \leq 26 \tag{5a}$$

Inequalities (1) to (5) may be replaced with the inequalities (1b) to (5b):

$$60 \leq \nu d21 \leq 95 \tag{1b}$$

$$40 \leq \nu d2Nave \leq 50 \tag{2b}$$

$$0 < \theta gF21 + 0.001 \times \nu d21 - 0.605 \tag{3b}$$

$$2.0 \leq f21/f2 \leq 3.5 \tag{4b}$$

$$\nu d2Pmin \leq 24 \tag{5b}$$

The zoom lens according to each example has the following configuration in addition to satisfying the above inequalities.

The second lens unit L2 has at least three negative lenses. The first negative lens of the second lens unit L2 may be a single lens. The first lens unit L1 may include, in order from the object side to the image side, a first sub-lens unit L1*a* that is fixed for focusing, a second sub-lens unit L1*b* that moves for focusing, and a third sub-lens unit L1*c* that is fixed for focusing.

The zoom lens may include, in order from the object side to the image side, a first lens unit L1 having positive refractive power that is fixed (does not move) for zooming, a second lens unit L2 having negative refractive power that moves during zooming, a third lens unit L3 having negative refractive power that moves during zooming, at least one lens unit (L4) that moves during zooming, and a final lens unit (L5) having positive refractive power, disposed closest to the image plane, and fixed during zooming. In particular, a zoom lens may include, in order from the object side to the image side, a first lens unit L1 having positive refractive power and fixed for zooming, a second lens unit L2 having negative refractive power that moves during zooming, a third lens unit L3 having negative refractive power that moves during zooming, a fourth lens unit L4 having positive refractive power that moves during zooming, and a final lens unit (L5) having positive refractive power that is fixed (does not move) during zooming. The final lens unit may be a fifth lens unit L5 counted from the object side.

A description will now be given of Examples 1 to 5. After Example 5, numerical examples 1 to 5 corresponding to Examples 1 to 5 will be illustrated.

Example 1

The zoom lens according to Example 1 (numerical example 1) illustrated in FIG. 1 includes, in order from the object side to the image side, a first lens unit L1 having positive refractive power, a second lens unit L2 having negative refractive power, a third lens unit L3 having negative refractive power, a fourth lens unit L4 having positive refractive power, and a fifth lens unit (final lens unit) L5 having positive refractive power. In the zoom lens according to Example 1, during zooming from the wide-angle end to the telephoto end, the first lens unit L1 and the fifth lens unit L5 are fixed relative to the image plane I, and the second lens unit L2, the third lens unit L3, the fourth lens unit L4 move. Zooming is performed by moving the second lens unit L2 and the third lens unit L3, and image plane compensation accompanying zooming is performed by moving the fourth lens unit L4.

In the zoom lens according to Example 1, the aperture stop SP is disposed closest to the object of the fourth lens unit L4, and moves integrally with the fourth lens unit L4 during zooming from the wide-angle end to the telephoto end. Thereby, the size and weight of the first lens unit L1 can be reduced.

Illustrated below the lens units that move during zooming in FIG. 1 is a moving locus of each lens unit during zooming from the wide-angle end to the telephoto end. This is also applied to the drawings of other examples.

The first lens unit L1 includes, in order from the object side to the image side, a first sub-lens unit L1*a* having negative refractive power that is fixed for focusing, a second sub-lens unit L1*b* having positive refractive power that moves for focusing, and a third sub-lens unit L1*c* having positive refractive power that is fixed for focusing. The second sub-lens unit L1*b* moves toward the image side during focusing from an object at infinity to a close distance, as illustrated by the arrow below the second sub-lens unit L1*b* in FIG. 1.

The second lens unit L2 includes, in order from the object side to the image side, a first negative lens, a negative lens, a positive lens, and a negative lens.

In numerical example 1, a surface number i represents the order of the surfaces counted from the object side. r represents a radius of curvature of an i-th surface counted from the object side (mm), d represents a lens thickness or air gap (air distance) (mm) between i-th and (i+1)-th surfaces, and nd represents a refractive index for the d-line of an optical material between the i-th and (i+1)-th surfaces. νd is an Abbe number based on the d-line of the optical material between the i-th and (i+1)-th surfaces. BF represents back focus (mm). "Back focus" is a distance on the optical axis from the final surface (lens surface closest to the image plane) of the zoom lens to a paraxial image surface expressed in terms of the air equivalent length. The "overall lens length" is a distance on the optical axis from the frontmost (foremost) surface (lens surface closest to the object) to the final surface of the zoom lens plus the back focus.

An asterisk "*" attached to the right side of a surface number means that the optical surface is aspheric. The aspherical shape is expressed as follows:

$$X = (h^2/R)/\left[1 + \{1 - (1 + K)(H/R)^2\}^{1/2}\right] + A4 \times h^4 + A6 \times h^6 + A8 \times h^8 + A10 \times h^{10} + A12 \times h^{12} + A14 \times h^{14} + A16 \times h^{16}$$

where X is a displacement amount from the surface vertex in the optical axis direction, H is a height from the optical axis in the direction perpendicular to the optical axis, a light traveling direction is set positive, R is a paraxial radius of curvature, K is a conical constant, and A4, A6, A8, A10, A12, A14, and A16 are aspherical coefficients of each order. "e±X" in each aspherical coefficient means "$\times 10^{\pm X}$." The description for the above numerical example is the same for other numerical examples. WIDE represents the wide-angle end, MIDDLE represents an intermediate (middle) zoom position, TELE represents a telephoto end.

Table 1 summarizes values of inequalities (1) to (5) in numerical example 1. Numerical example 1 satisfies inequalities (1) to (5).

Figure 2A:
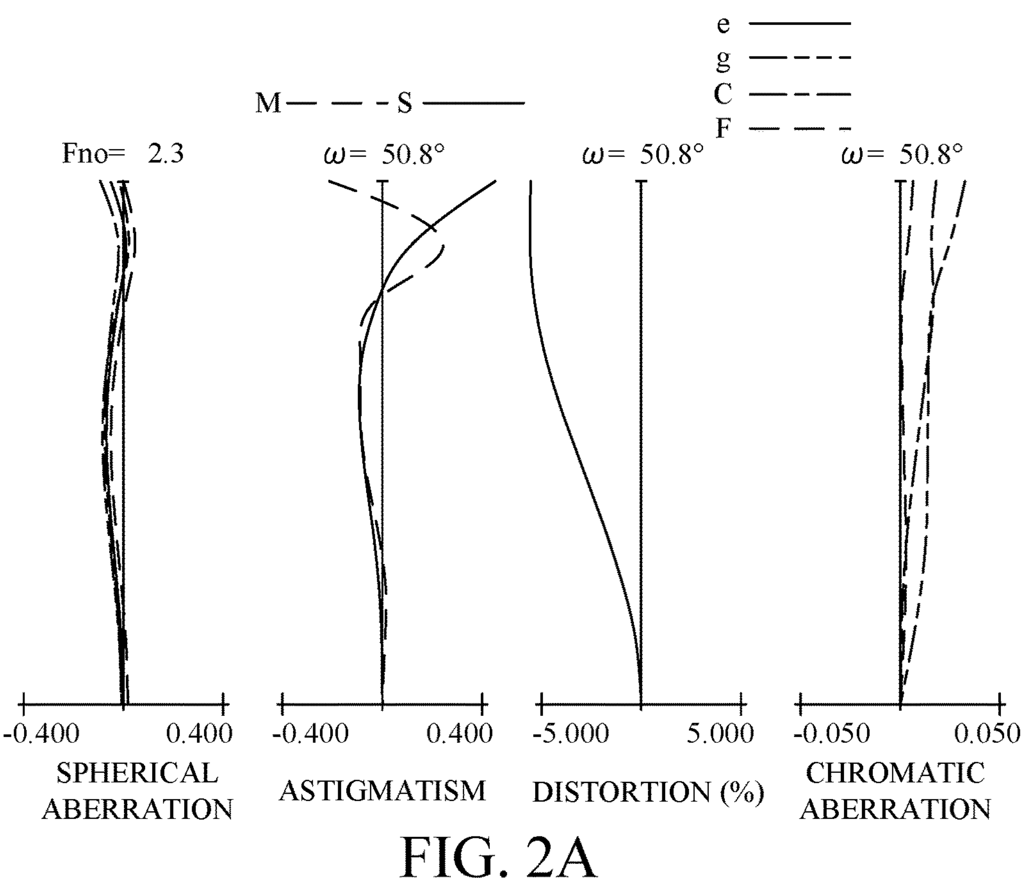
FIGS. 2A and 2B are aberration diagrams of the zoom lens according to numerical example 1 at a wide-angle end and intermediate zoom position in an in-focus state at infinity.
Figure 2B:
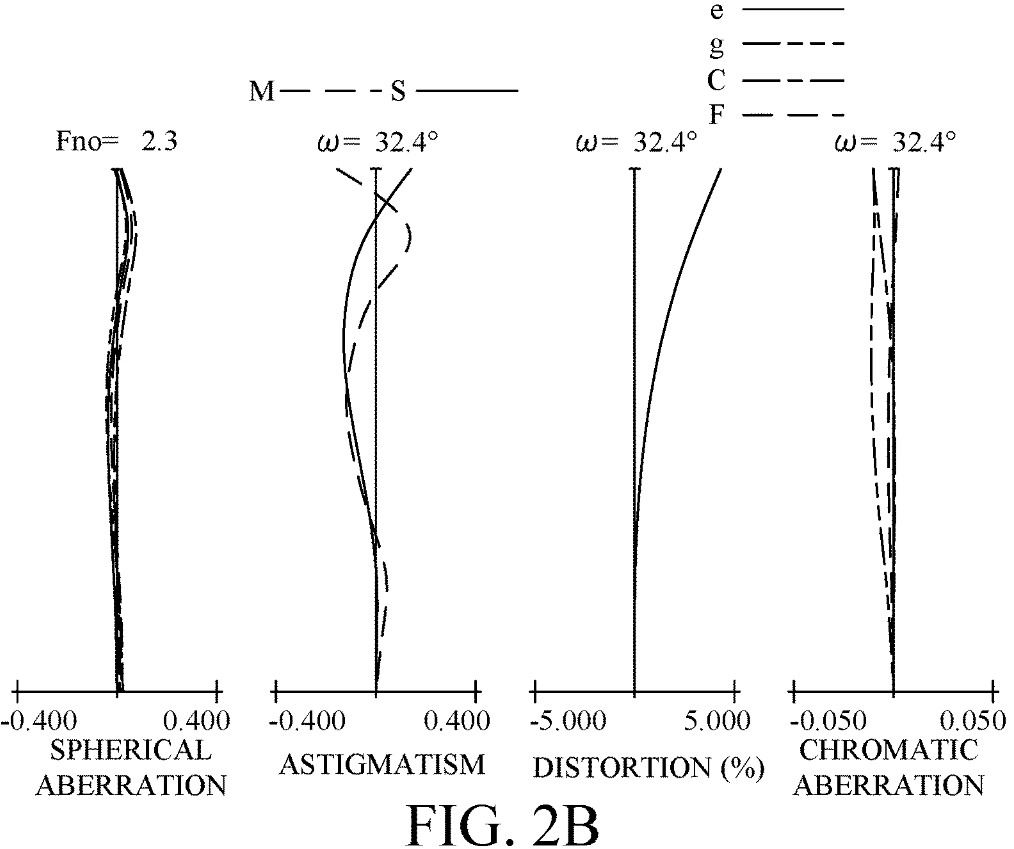
Figure 3:
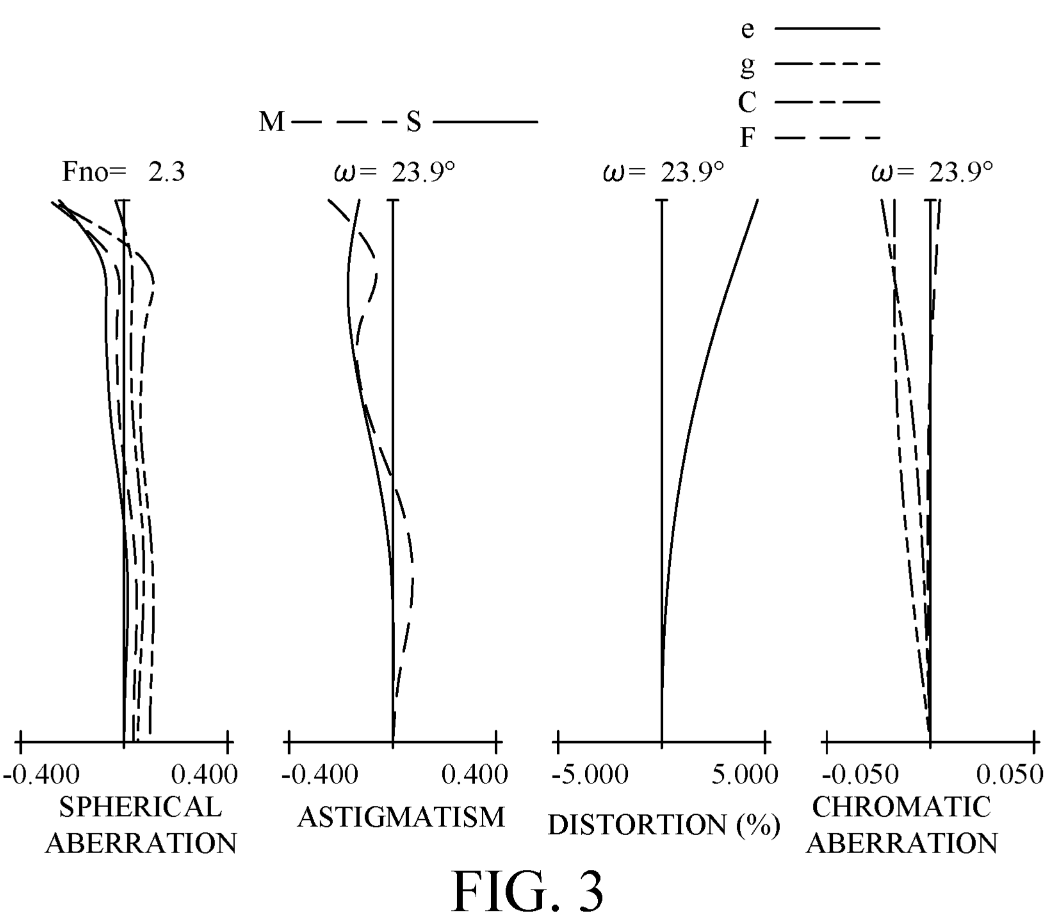
FIG. 3 is an aberration diagram of the zoom lens according to numerical example 1 at a telephoto end in an in-focus state at infinity.

FIGS. 2A, 2B, and 3 illustrate longitudinal aberrations (spherical aberration, astigmatism, distortion, and chromatic aberration) of the zoom lens according to numerical example 1 in an in-focus state at infinity at the wide-angle end, intermediate zoom position, and telephoto end, respectively. In the spherical aberration diagram, Fno represents an F-number, a solid line represents a spherical aberration amount for the e-line (wavelength 546.1 nm), an alternate long and two short dashes line represents a spherical aberration amount for the g-line, an alternate long and short dash line represents a spherical aberration amount for the C-line, and a broken line represents a spherical aberration amount for the F-line. In the astigmatism diagram, a solid line S illustrates an astigmatism amount on a sagittal image plane, and a broken line M illustrates an astigmatism amount on a meridional image plane. @ represents a half angle of view (°). The distortion diagram illustrates a distortion amount for the e-line. The chromatic aberration diagram illustrates lateral chromatic aberration amounts for the g-line, C-line, and F-line. The spherical aberration diagram has a scale of 0.4 mm, the astigmatism diagram has a scale of 0.4 mm, the distortion diagram has a scale of 5%, and the lateral chromatic aberration diagram has a scale of 0.05 mm. The above description of the longitudinal aberration diagram is similarly applicable to other numerical examples.

Example 2

Figure 4:
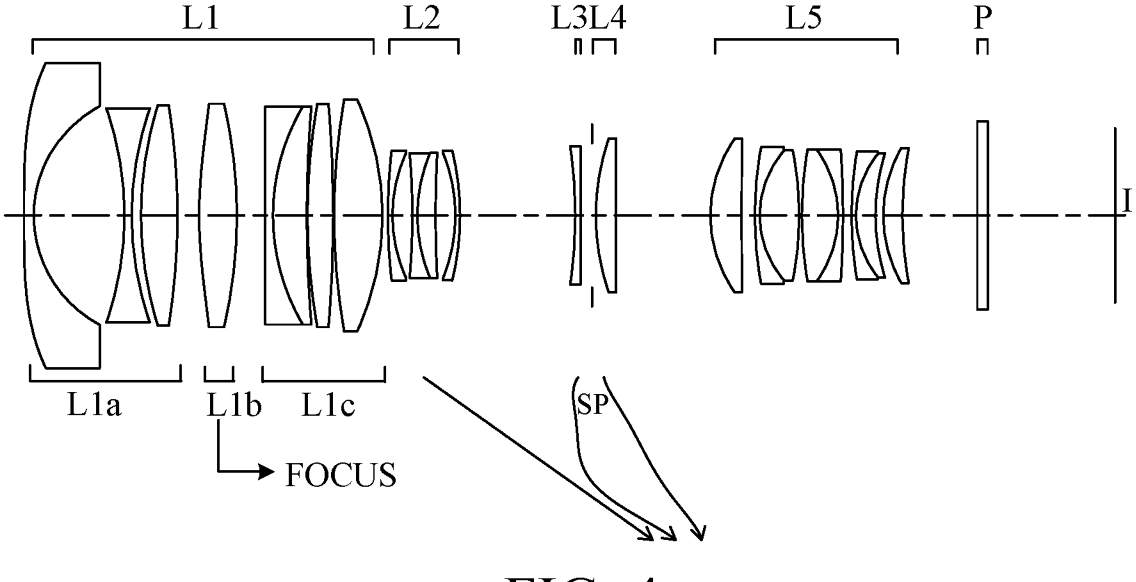
FIG. 4 is a sectional view of a zoom lens according to Example 2 (numerical example 2).

The zoom lens according to Example 2 (numerical example 2) illustrated in FIG. 4 has the same configuration as that of Example 1. The first lens unit L1 and the second lens unit L2 are similar to those of Example 1.

Table 1 summarizes values of inequalities (1) to (5) in numerical example 2. Numerical example 2 satisfies inequalities (1) to (5).

Figure 5A:
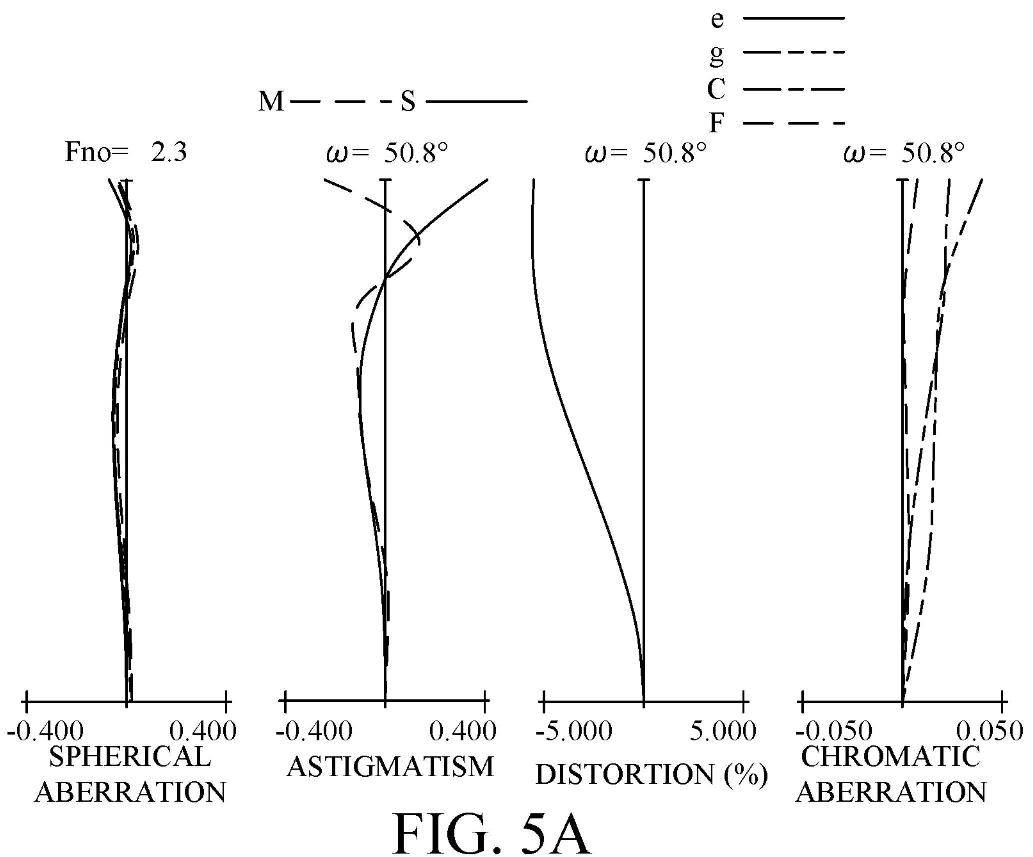
FIGS. 5A and 5B are aberration diagrams of the zoom lens according to numerical example 2 at a wide-angle end and intermediate zoom position in an in-focus state at infinity.
Figure 5B:
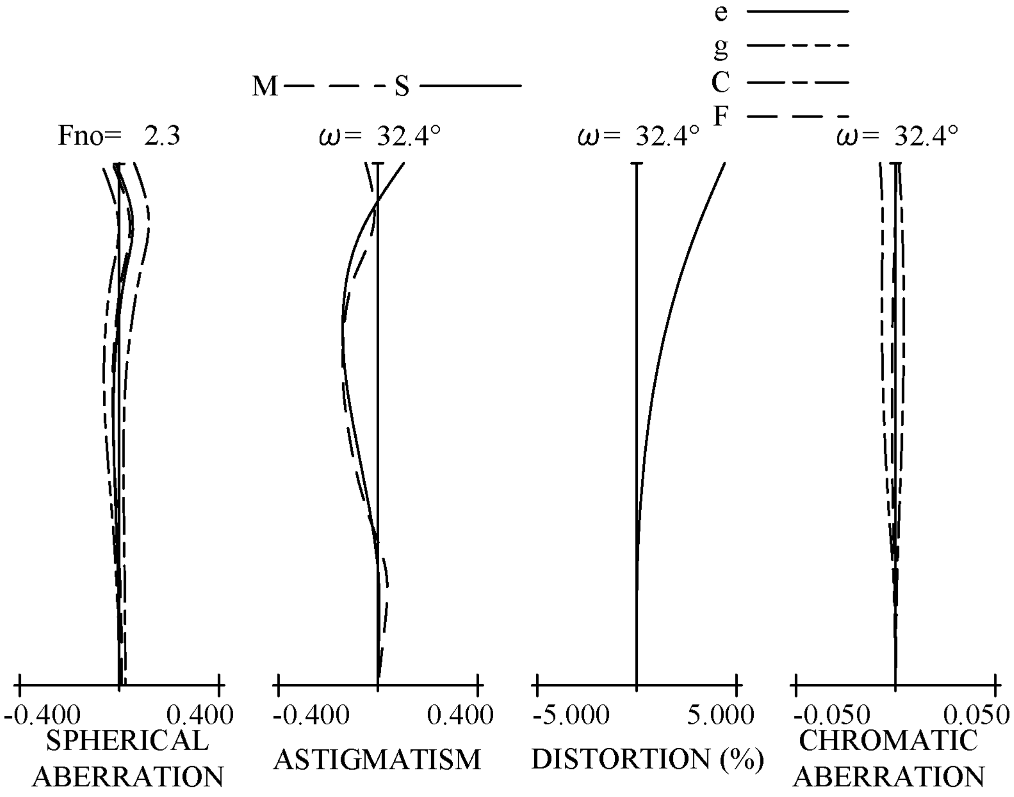
Figure 6:
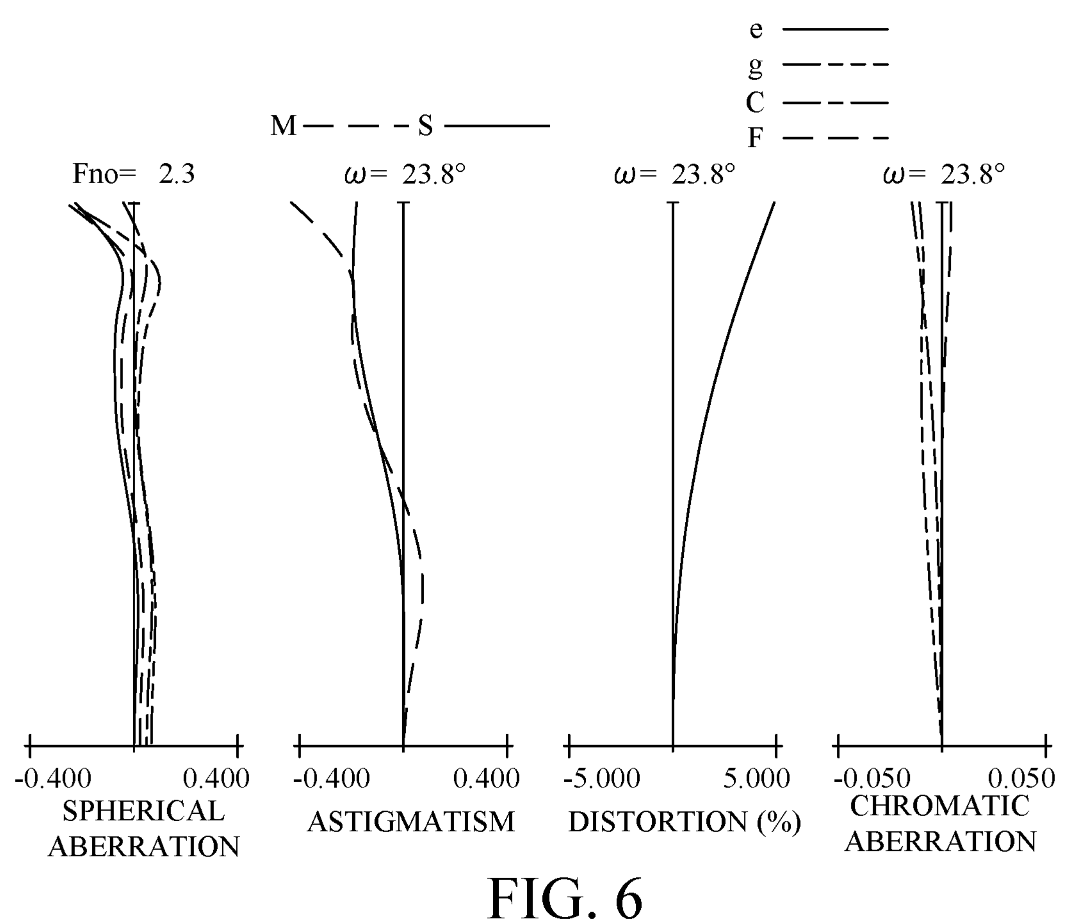
FIG. 6 is an aberration diagram of the zoom lens according to numerical example 2 at a telephoto end in an in-focus state at infinity.

FIGS. 5A, 5B, and 6 illustrate the longitudinal aberration of the zoom lens according to numerical example 2 in an in-focus state at infinity at the wide-angle end, intermediate zoom position, and telephoto end, respectively.

Example 3

Figure 7:
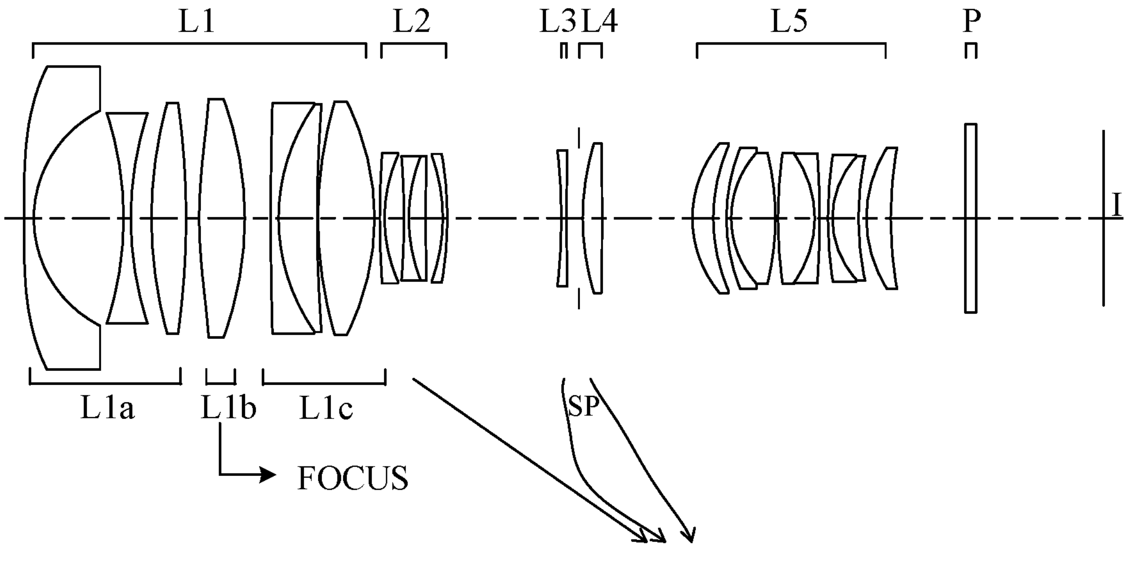
FIG. 7 is a sectional view of a zoom lens according to Example 3 (numerical example 3).

The zoom lens according to Example 3 (numerical example 3) illustrated in FIG. 7 has the same configuration as that of Example 1. The first lens unit L1 and the second lens unit L2 are similar to those of Example 1.

Table 1 summarizes values of inequalities (1) to (5) in numerical example 3. Numerical example 3 satisfies inequalities (1) to (5).

Figures 8A, 8B:
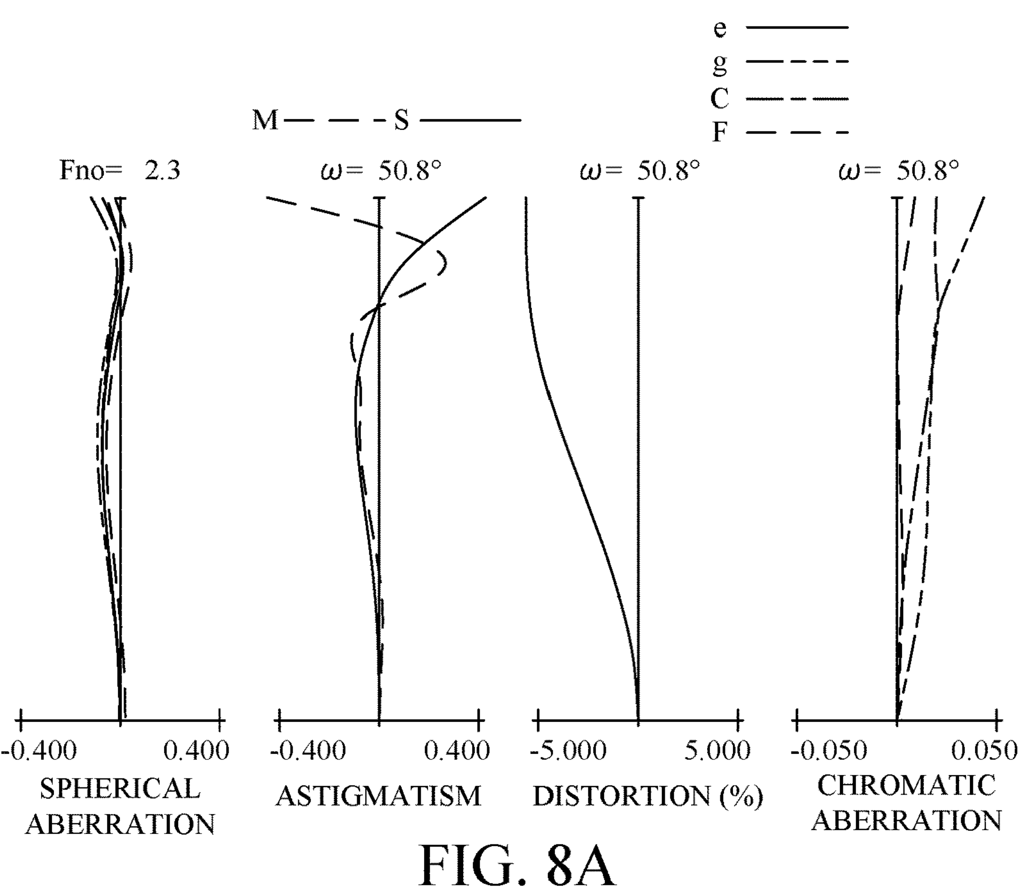
FIGS. 8A and 8B are aberration diagrams of the zoom lens according to numerical example 3 at a wide-angle end and intermediate zoom position in an in-focus state at infinity.
Figure 9:
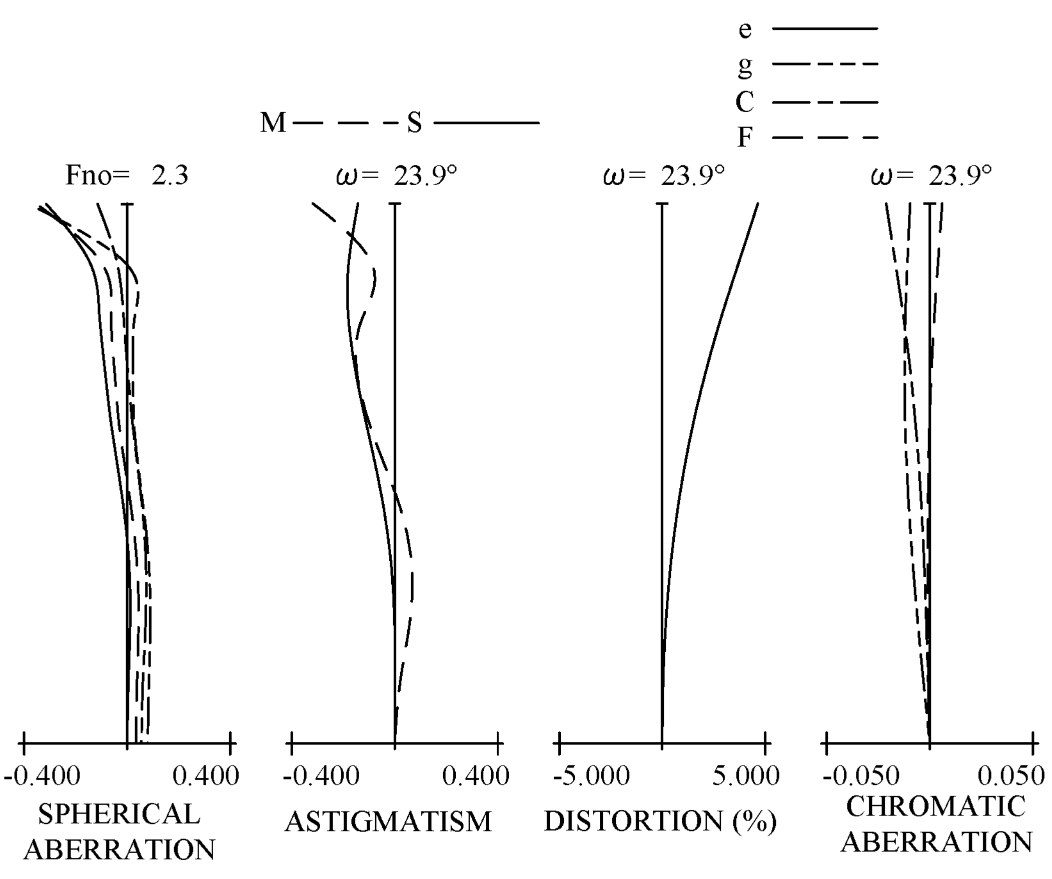
FIG. 9 is an aberration diagram of the zoom lens according to numerical example 3 at a telephoto end in an in-focus state at infinity.

FIGS. 8A, 8B, and 9 illustrate the longitudinal aberrations of the zoom lens according to numerical example 3 in an in-focus state at infinity at the wide-angle end, intermediate zoom position, and telephoto end, respectively.

Example 4

Figure 10:
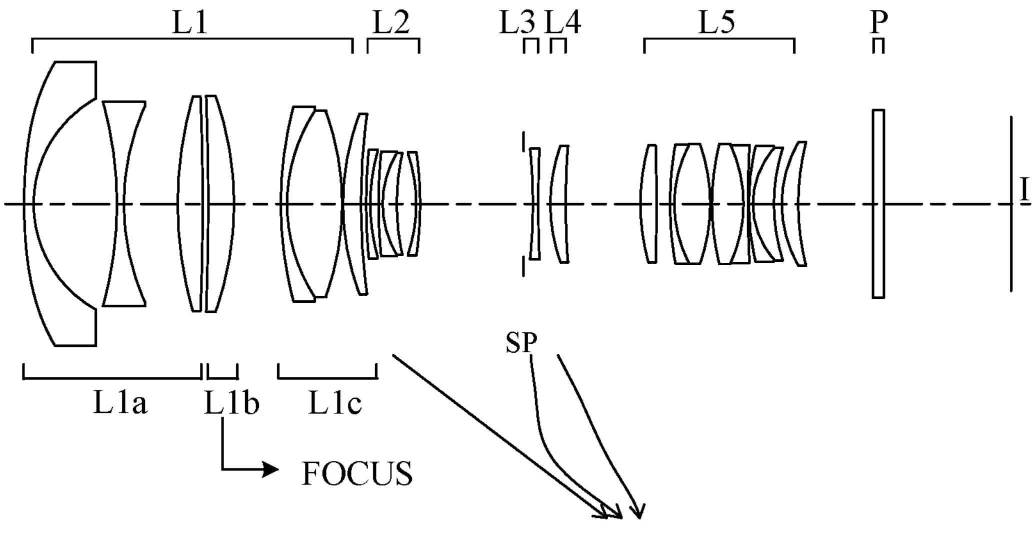
FIG. 10 is a sectional view of a zoom lens according to Example 4 (numerical example 4).

The zoom lens according to Example 4 (numerical example 4) illustrated in FIG. 10 has the same configuration as that of Example 1 except for the position of the aperture stop SP. The aperture stop SP is disposed closest to the object of the third lens unit L3, and moves integrally with the third lens unit L3 during zooming from the wide-angle end to the telephoto end. Thereby, the size and weight of the first lens unit L1 can be reduced. The first lens unit L1 and the second lens unit L2 are similar to those of Example 1.

Table 1 summarizes values of inequalities (1) to (5) in numerical example 4. Numerical example 4 satisfies inequalities (1) to (5).

Figure 11A:
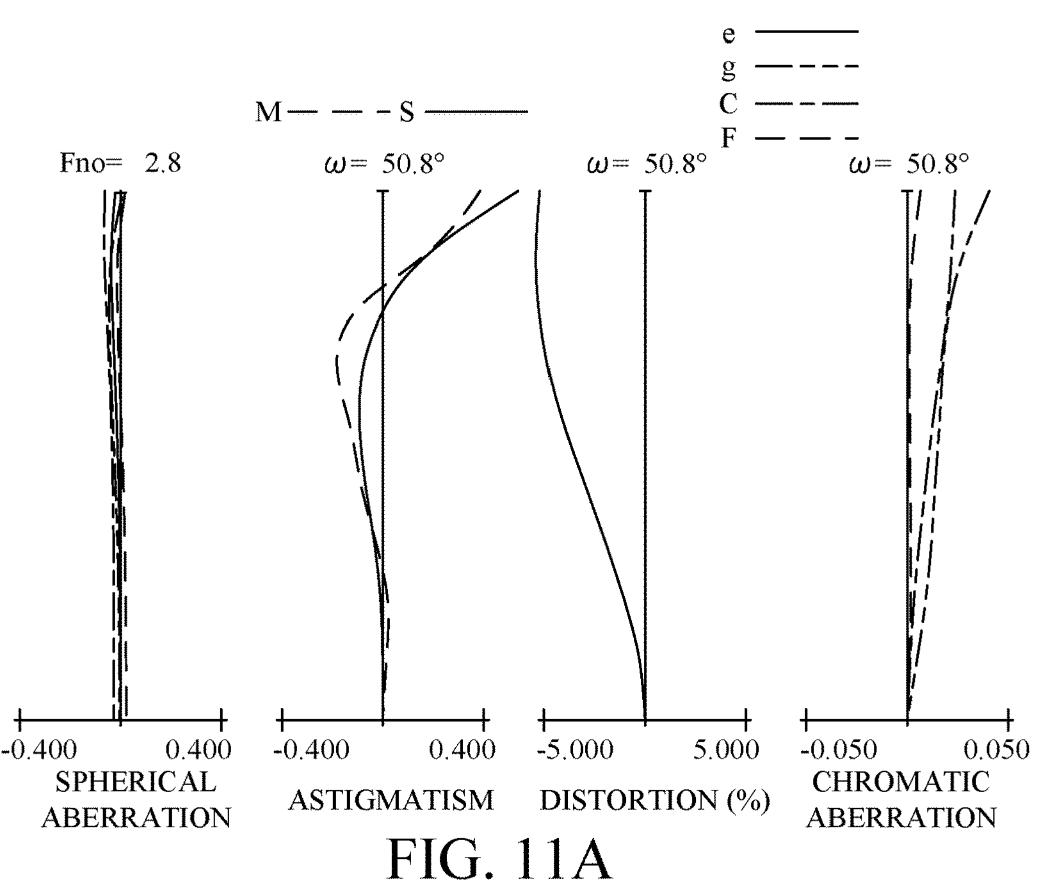
FIGS. 11A and 11B are aberration diagrams of the zoom lens according to numerical example 4 at a wide-angle end and intermediate zoom position in an in-focus state at infinity.
Figure 11B:
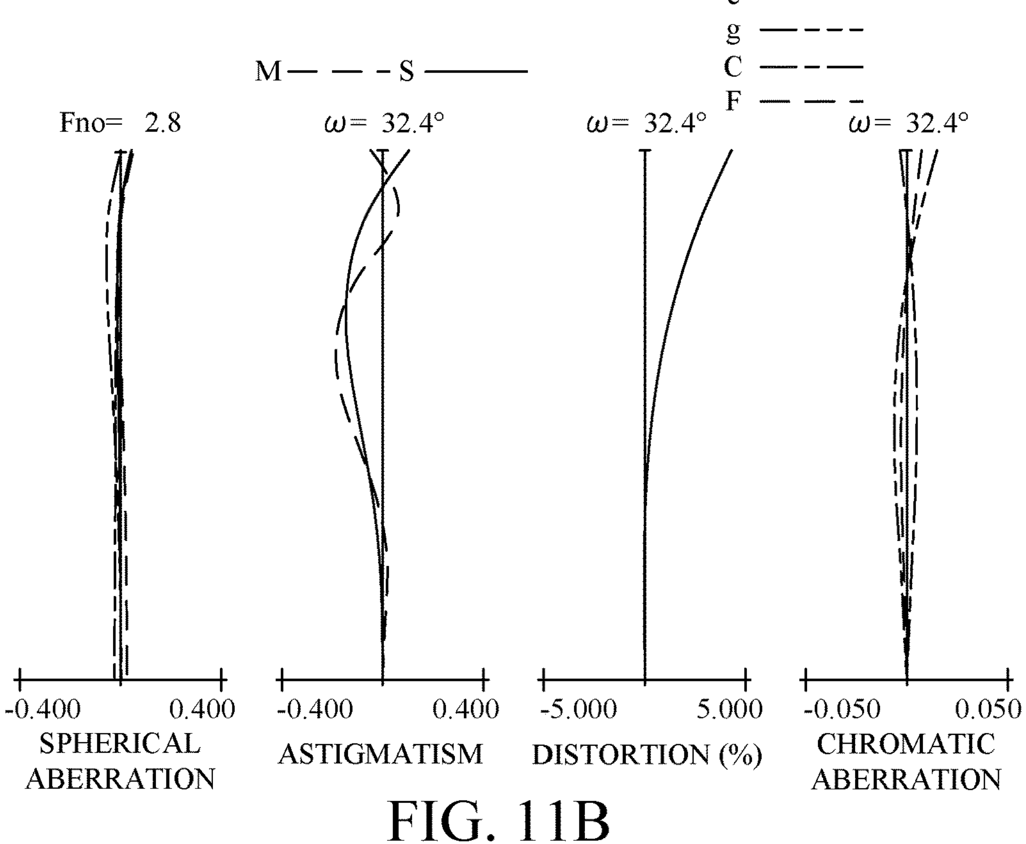
Figure 12:
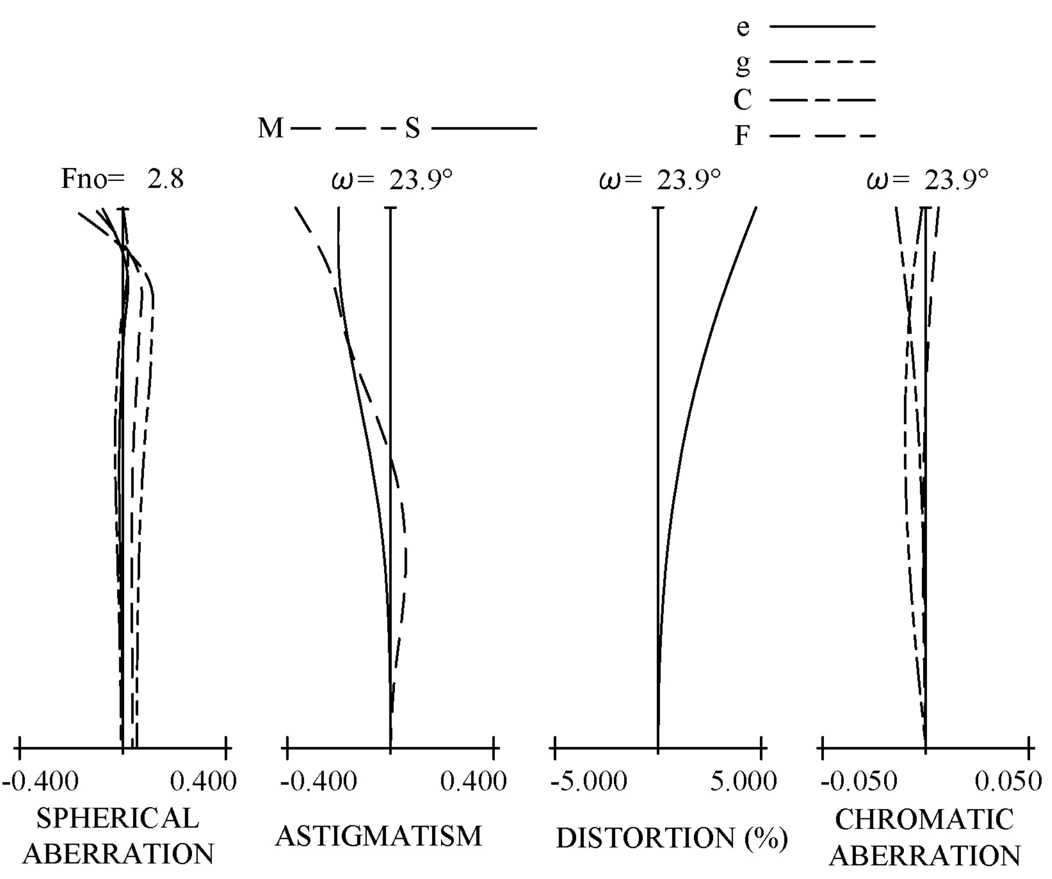
FIG. 12 is an aberration diagram of the zoom lens according to numerical example 4 at a telephoto end in an in-focus state at infinity.

FIGS. 11A, 11B, and 12 illustrate the longitudinal aberration of the zoom lens according to numerical example 4 in an in-focus state at infinity at the wide-angle end, intermediate zoom position, and telephoto end, respectively.

Example 5

Figure 13:
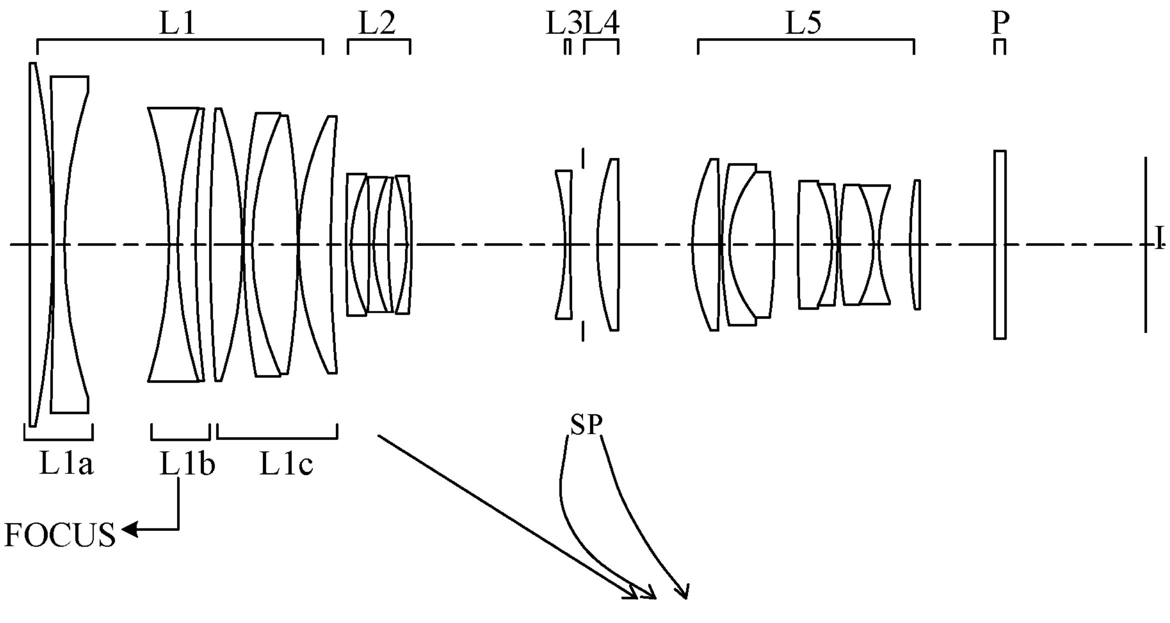
FIG. 13 is a sectional view of a zoom lens according to Example 5 (numerical example 5).

The zoom lens according to Example 5 (numerical example 5) illustrated in FIG. 13 has the same configuration as that of Example 1 except for the configuration of the first lens unit L1. The first lens unit L1 includes, in order from the object side to the image side, a first sub-lens unit L1*a* having negative refractive power that is fixed for focusing, a second sub-lens unit L1*b* having negative refractive power that moves for focusing, and a third sub-lens unit L1*c* having positive refractive power that is fixed for focusing. The second sub-lens unit L1*b* moves toward the object side during focusing from an object at infinity to an object at a close distance, as illustrated by an arrow below the second sub-lens unit L1*b* in FIG. 13. The second lens unit L2 is similar to that of Example 1.

Table 1 summarizes values of inequalities (1) to (5) in numerical example 5. Numerical example 5 satisfies inequalities (1) to (5).

Figure 14A:
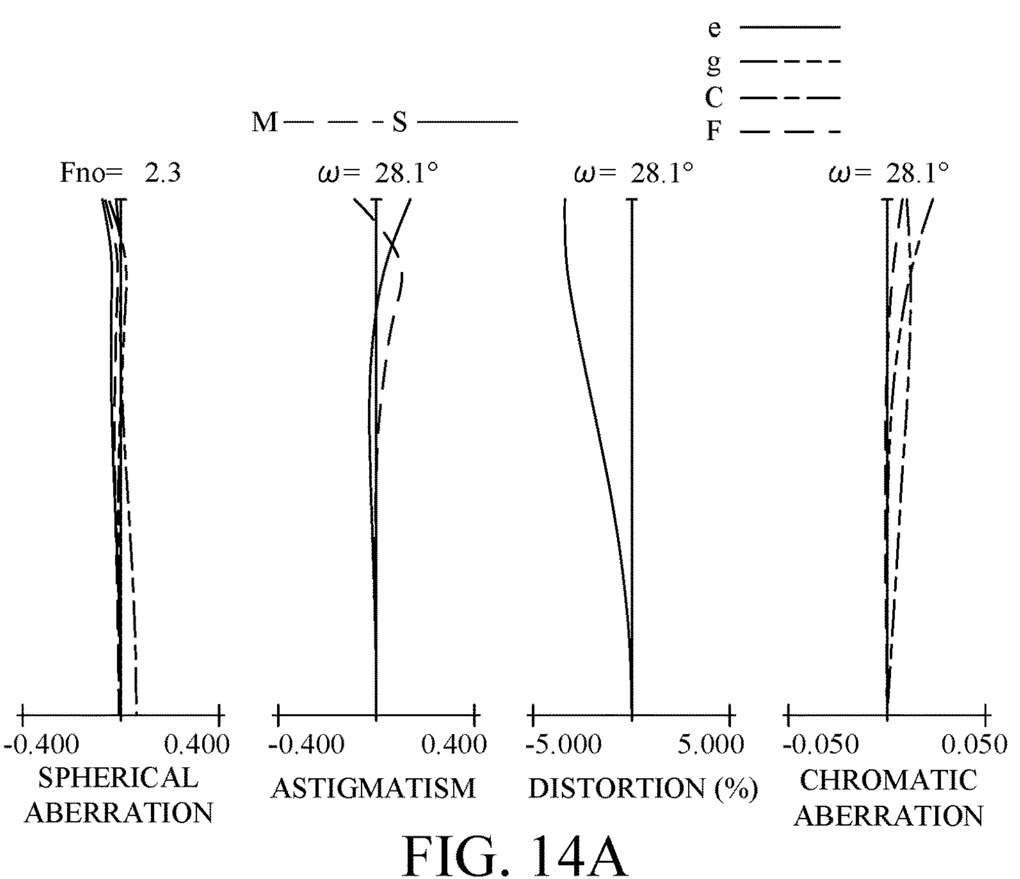
FIGS. 14A and 14B are aberration diagrams of the zoom lens according to numerical example 5 at a wide-angle end and intermediate zoom position in an in-focus state at infinity.
Figure 14B:
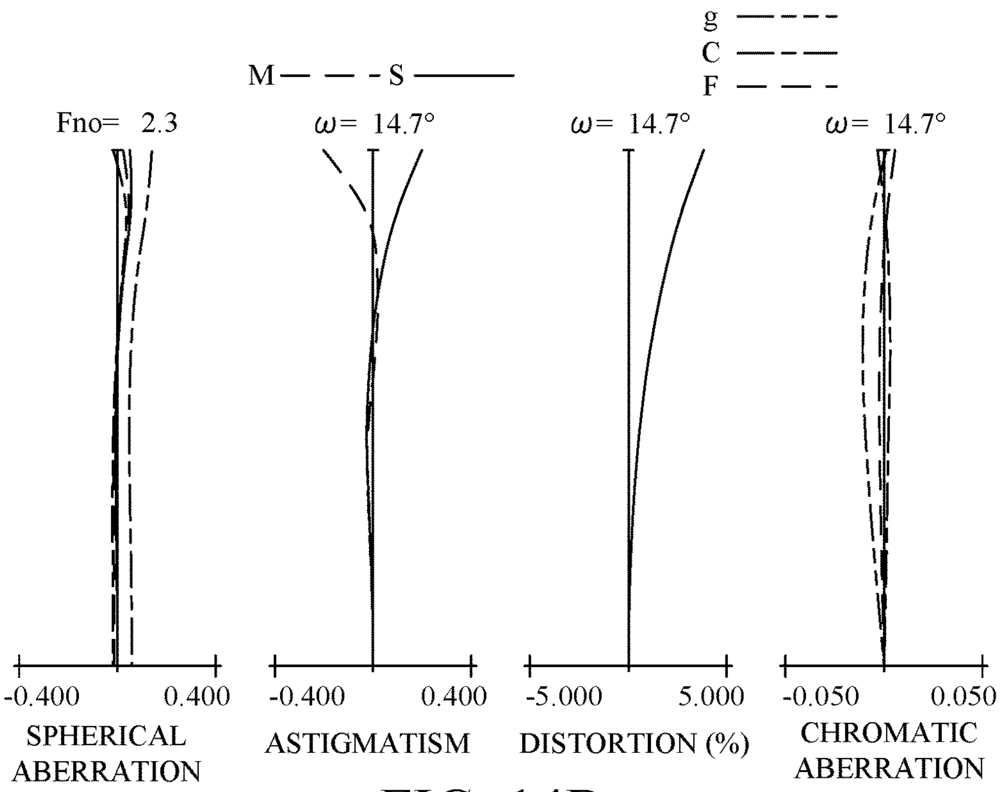
Figures 15, 16:
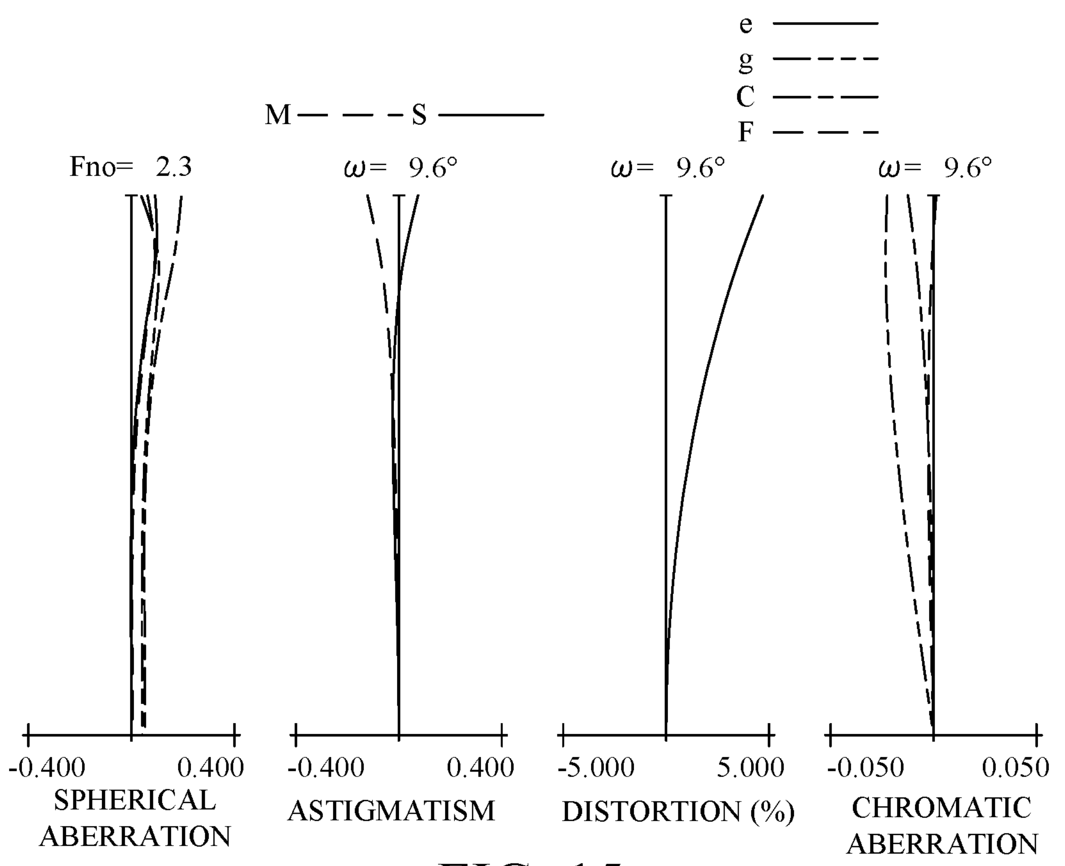
FIG. 15 is an aberration diagram of the zoom lens according to numerical example 5 at a telephoto end in an in-focus state at infinity.
FIG. 16 illustrates an image pickup apparatus using the zoom lens according to any one of Examples 1 to 5.

FIGS. 14A, 14B, and 15 illustrate the longitudinal aberration of the zoom lens according to numerical example 5 in an in-focus state at infinity at the wide-angle end, intermediate zoom position, and telephoto end, respectively.

NUMERICAL EXAMPLE 1
UNIT: mm

SURFACE DATA

| Surface No. | r | d | nd | νd | θgF |
|---|---|---|---|---|---|
| 1* | 1000.000 | 2.60 | 1.78800 | 47.4 | 0.5559 |
| 2 | 32.256 | 23.95 | | | |
| 3 | −88.377 | 1.90 | 1.76385 | 48.5 | 0.5589 |
| 4 | 88.377 | 5.66 | | | |
| 5 | 114.091 | 8.79 | 1.84666 | 23.8 | 0.6205 |
| 6 | −260.864 | 3.67 | | | |
| 7* | 129.142 | 12.01 | 1.59522 | 67.7 | 0.5442 |
| 8 | −91.536 | 7.58 | | | |
| 9 | 904.821 | 2.10 | 1.80518 | 25.4 | 0.6161 |
| 10 | 52.963 | 10.78 | 1.43875 | 94.7 | 0.5340 |
| 11 | 317.068 | 0.20 | | | |
| 12 | 114.339 | 14.88 | 1.72916 | 54.7 | 0.5444 |
| 13 | −70.167 | (Variable) | | | |
| 14 | 161.422 | 1.25 | 1.49700 | 81.5 | 0.5375 |
| 15 | 40.138 | 5.16 | | | |
| 16 | −217.790 | 1.25 | 1.83481 | 42.7 | 0.5648 |
| 17 | 45.454 | 4.15 | 1.80810 | 22.8 | 0.6307 |
| 18 | 322.514 | 5.05 | | | |
| 19 | −45.032 | 1.25 | 1.76385 | 48.5 | 0.5589 |
| 20 | −85.515 | (Variable) | | | |
| 21 | −116.625 | 1.40 | 1.43875 | 94.7 | 0.5340 |
| 22 | 1041.652 | (Variable) | | | |
| 23 (SP) | ∞ | 1.00 | | | |
| 24 | 65.715 | 5.25 | 1.80610 | 40.9 | 0.5713 |
| 25* | −428.432 | (Variable) | | | |
| 26 | 33.050 | 5.45 | 1.51633 | 64.1 | 0.5353 |
| 27 | 60.689 | 3.50 | | | |

-continued

NUMERICAL EXAMPLE 1
UNIT: mm

| | | | | | |
|---|---|---|---|---|---|
| 28 | 56.772 | 1.30 | 2.00100 | 29.1 | 0.5997 |
| 29 | 28.425 | 11.14 | 1.43875 | 94.7 | 0.5340 |
| 30 | −72.765 | 0.45 | | | |
| 31 | 105.407 | 9.37 | 1.80810 | 22.8 | 0.6307 |
| 32 | −32.447 | 1.30 | 2.00100 | 29.1 | 0.5997 |
| 33 | −153.700 | 0.62 | | | |
| 34 | 98.937 | 1.20 | 2.00100 | 29.1 | 0.5997 |
| 35 | 22.799 | 7.13 | 1.49700 | 81.5 | 0.5375 |
| 36 | 69.983 | 2.10 | | | |
| 37 | 34.396 | 5.67 | 1.49700 | 81.5 | 0.5375 |
| 38 | 98.780 | (Variable) | | | |
| 39 | ∞ | 2.80 | 1.51633 | 64.1 | 0.5353 |
| 40 | ∞ | (Variable) | | | |
| Image Plane | ∞ | | | | |

ASPHERIC DATA

1st Surface
K = 0.00000e+00 A 4 = 3.52488e−06 A 6 = −2.13035e−09
A 8 = 1.49204e−12 A10 = −8.07214e−16 A12 = 3.18248e−19
A14 = −8.31641e−23 A16 = 1.10117e−26
7th Surface
K = 0.00000e+00 A 4 = −1.87828e−06 A 6 = 7.70106e−10
A 8 = −1.59518e−12 A10 = 3.02788e−15 A12 = −3.46030e−18
A14 = 2.16738e−21 A16 = −5.66670e−25
25th Surface
K = 0.00000e+00 A 4 = 1.75719e−06 A 6 = 3.28990e−10
A 8 = −4.90716e−13

VARIOUS DATA
ZOOM RATIO 2.5

| | WIDE | MIDDLE | TELE |
|---|---|---|---|
| Focal Length | 20.00 | 35.00 | 50.00 |
| Fno | 2.30 | 2.30 | 2.30 |
| Half Angle of View (°) | 49.24 | 33.54 | 24.89 |
| Image Height | 23.20 | 23.20 | 23.20 |
| Overall Lens Length | 278.91 | 278.91 | 278.91 |
| BF | 51.50 | 51.50 | 51.50 |
| d13 | 1.40 | 34.57 | 50.76 |
| d20 | 29.79 | 2.45 | 1.76 |
| d22 | 3.27 | 11.21 | 3.27 |
| d25 | 23.84 | 10.06 | 2.50 |
| d38 | 20.00 | 20.00 | 20.00 |
| d40 | 29.65 | 29.65 | 29.65 |

LENS UNIT DATA

| Lens Unit | Starting Surface | Focal Length |
|---|---|---|
| 1 | 1 | 49.60 |
| 2 | 14 | −38.73 |
| 3 | 21 | −238.36 |
| 4 | 23 | 70.61 |
| 5 | 26 | 89.85 |
| 6 | 39 | ∞ |

NUMERICAL EXAMPLE 2
UNIT: mm

SURFACE DATA

| Surface No. | r | d | nd | νd | θgF |
|---|---|---|---|---|---|
| 1* | 2000.000 | 2.60 | 1.80400 | 46.5 | 0.5577 |
| 2 | 32.927 | 24.21 | | | |
| 3 | −86.387 | 1.90 | 1.76385 | 48.5 | 0.5589 |
| 4 | 86.387 | 2.49 | | | |

-continued

NUMERICAL EXAMPLE 2
UNIT: mm

| | | | | | |
|---|---|---|---|---|---|
| 5 | 97.891 | 9.73 | 1.84666 | 23.8 | 0.6205 |
| 6 | −186.432 | 5.79 | | | |
| 7* | 121.200 | 10.07 | 1.59522 | 67.7 | 0.5442 |
| 8 | −128.816 | 7.50 | | | |
| 9 | 7866.732 | 2.10 | 1.84666 | 23.8 | 0.6205 |
| 10 | 57.091 | 9.01 | 1.43875 | 94.7 | 0.5340 |
| 11 | 338.868 | 0.20 | | | |
| 12 | 169.060 | 6.89 | 1.43387 | 95.1 | 0.5373 |
| 13 | −337.641 | 0.20 | | | |
| 14 | 177.596 | 12.93 | 1.76385 | 48.5 | 0.5589 |
| 15 | −73.703 | (Variable) | | | |
| 16 | 144.358 | 1.25 | 1.59410 | 60.5 | 0.5550 |
| 17 | 40.136 | 5.35 | | | |
| 18 | −175.011 | 1.25 | 1.80400 | 46.5 | 0.5577 |
| 19 | 42.542 | 4.86 | 1.84666 | 23.8 | 0.6205 |
| 20 | 283.982 | 5.32 | | | |
| 21 | −43.697 | 1.25 | 1.78800 | 47.4 | 0.5559 |
| 22 | −72.462 | (Variable) | | | |
| 23 | −123.732 | 1.40 | 1.49700 | 81.5 | 0.5375 |
| 24 | −3772.937 | (Variable) | | | |
| 25 (SP) | ∞ | 1.00 | | | |
| 26 | 62.367 | 5.33 | 1.80610 | 40.9 | 0.5701 |
| 27* | −981.551 | (Variable) | | | |
| 28 | 35.425 | 8.36 | 1.51633 | 64.1 | 0.5353 |
| 29 | 1902.974 | 3.50 | | | |
| 30 | 97.020 | 1.30 | 2.00100 | 29.1 | 0.5997 |
| 31 | 26.137 | 10.60 | 1.43875 | 94.7 | 0.5340 |
| 32 | −85.247 | 0.65 | | | |
| 33 | 100.001 | 9.71 | 1.89286 | 20.4 | 0.6393 |
| 34 | −29.768 | 1.30 | 2.00069 | 25.5 | 0.6136 |
| 35 | −249.566 | 2.20 | | | |
| 36 | 96.213 | 1.20 | 2.00069 | 25.5 | 0.6136 |
| 37 | 25.904 | 5.21 | 1.48749 | 70.2 | 0.5300 |
| 38 | 54.465 | 2.10 | | | |
| 39 | 36.080 | 5.06 | 1.55200 | 70.7 | 0.5421 |
| 40 | 93.903 | (Variable) | | | |
| 41 | ∞ | 2.80 | 1.51633 | 64.1 | 0.5353 |
| 42 | ∞ | (Variable) | | | |
| Image Plane | ∞ | | | | |

ASPHERIC DATA

1st Surface
K = 0.00000e+00 A 4 = 3.43280e−06 A 6 = −2.00828e−09
A 8 = 1.37084e−12 A10 = −7.61401e−16 A12 = 3.28150e−19
A14 = −9.63684e−23 A16 = 1.39035e−26
7th Surface
K = 0.00000e+00 A 4 = −1.71014e−06 A 6 = 9.30430e−10
A 8 = −2.76952e−12 A10 = 6.48482e−15 A12 = −8.84033e−18
A14 = 6.44490e−21 A16 = −1.92691e−24
27th Surface
K = 0.00000e+00 A 4 = 1.83716e−06 A 6 = 1.72553e−10
A 8 = −1.67707e−13

VARIOUS DATA
ZOOM RATIO 2.50

| | WIDE | MIDDLE | TELE |
|---|---|---|---|
| Focal Length | 20.00 | 34.99 | 50.00 |
| Fno | 2.30 | 2.30 | 2.30 |
| Half Angle of View (°) | 49.24 | 33.55 | 24.89 |
| Image Height | 23.20 | 23.20 | 23.20 |
| Overall Lens Length | 283.23 | 283.23 | 283.23 |
| BF | 49.04 | 49.04 | 49.04 |
| d15 | 1.40 | 34.04 | 50.17 |
| d22 | 30.73 | 1.88 | 2.81 |
| d24 | 3.05 | 12.18 | 3.05 |
| d27 | 25.20 | 12.28 | 4.35 |
| d40 | 20.00 | 20.00 | 20.00 |
| d42 | 27.20 | 27.20 | 27.20 |

-continued

| NUMERICAL EXAMPLE 2 UNIT: mm | | |
|---|---|---|
| LENS UNIT DATA | | |
| Lens Unit | Starting Surface | Focal Length |
| 1 | 1 | 48.74 |
| 2 | 16 | −38.46 |
| 3 | 23 | −256.68 |
| 4 | 25 | 72.49 |
| 5 | 28 | 91.92 |
| 6 | 41 | ∞ |

NUMERICAL EXAMPLE 3
UNIT: mm

SURFACE DATA

| Surface No. | r | d | nd | νd | θgF |
|---|---|---|---|---|---|
| 1* | 1500.000 | 2.60 | 1.78800 | 47.4 | 0.5559 |
| 2 | 32.038 | 23.94 | | | |
| 3 | −89.817 | 1.90 | 1.76385 | 48.5 | 0.5589 |
| 4 | 89.817 | 5.52 | | | |
| 5 | 114.049 | 9.28 | 1.84666 | 23.8 | 0.6205 |
| 6 | −217.713 | 3.46 | | | |
| 7* | 121.006 | 12.18 | 1.53775 | 74.7 | 0.5392 |
| 8 | −91.236 | 6.89 | | | |
| 9 | 1055.000 | 2.10 | 1.80518 | 25.4 | 0.6161 |
| 10 | 52.458 | 10.29 | 1.43875 | 94.7 | 0.5340 |
| 11 | 397.280 | 0.20 | | | |
| 12 | 110.081 | 15.11 | 1.71300 | 53.9 | 0.5459 |
| 13 | −68.928 | (Variable) | | | |
| 14 | 239.083 | 1.25 | 1.43875 | 94.7 | 0.5340 |
| 15 | 40.835 | 5.21 | | | |
| 16 | −195.294 | 1.25 | 1.88300 | 40.8 | 0.5667 |
| 17 | 44.180 | 4.55 | 1.80810 | 22.8 | 0.6307 |
| 18 | 985.952 | 4.55 | | | |
| 19 | −48.671 | 1.25 | 1.83481 | 42.7 | 0.5648 |
| 20 | −93.411 | (Variable) | | | |
| 21 | −155.198 | 1.40 | 1.49700 | 81.5 | 0.5375 |
| 22 | 907.601 | (Variable) | | | |
| 23 (SP) | ∞ | 1.00 | | | |
| 24 | 67.900 | 5.18 | 1.79952 | 42.2 | 0.5675 |
| 25* | −418.024 | (Variable) | | | |
| 26 | 30.948 | 5.57 | 1.51633 | 64.1 | 0.5353 |
| 27 | 47.783 | 3.50 | | | |
| 28 | 49.767 | 1.30 | 2.00100 | 29.1 | 0.5997 |
| 29 | 25.996 | 11.77 | 1.43875 | 94.7 | 0.5340 |
| 30 | −72.593 | 0.65 | | | |
| 31 | 120.105 | 9.84 | 1.89286 | 20.4 | 0.6393 |
| 32 | −29.405 | 1.30 | 2.00069 | 25.5 | 0.6136 |
| 33 | −245.364 | 2.20 | | | |
| 34 | 107.162 | 1.20 | 2.00069 | 25.5 | 0.6136 |
| 35 | 24.048 | 6.94 | 1.48749 | 70.2 | 0.5300 |
| 36 | 77.451 | 2.10 | | | |
| 37 | 34.720 | 6.49 | 1.48749 | 70.2 | 0.5300 |
| 38 | 103.366 | (Variable) | | | |
| 39 | ∞ | 2.80 | 1.51633 | 64.1 | 0.5353 |
| 40 | ∞ | (Variable) | | | |
| Image Plane | ∞ | | | | |

ASPHERIC DATA

1st Surface
K = 0.00000e+00 A 4 = 3.76881e−06 A 6 = −2.44791e−09
A 8 = 1.83951e−12 A10 = −1.10755e−15 A12 = 5.10954e−19
A14 = −1.59558e−22 A16 = 2.42671e−26
7th Surface
K = 0.00000e+00 A 4 = −2.08474e−06 A 6 = 8.21266e−10
A 8 = −1.63814e−12 A10 = 3.04825e−15 A12 = −3.44439e−18
A14 = 2.15183e−21 A16 = −5.63274e−25
25th Surface -continued NUMERICAL EXAMPLE 3
UNIT: mm K = 0.00000e+00 A 4 = 1.61320e−06 A 6 = 3.36179e−10
A 8 = −4.84049e−13

| VARIOUS DATA ZOOM RATIO 2.50 | | | |
|---|---|---|---|
| | WIDE | MIDDLE | TELE |
| Focal Length | 20.00 | 35.00 | 50.00 |
| Fno | 2.30 | 2.30 | 2.30 |
| Half Angle of View (°) | 49.24 | 33.54 | 24.89 |
| Image Height | 23.20 | 23.20 | 23.20 |
| Overall Lens Length | 280.12 | 280.12 | 280.12 |
| BF | 49.04 | 49.04 | 49.04 |
| d13 | 1.40 | 34.91 | 51.02 |
| d20 | 30.35 | 2.69 | 2.23 |
| d22 | 3.30 | 11.76 | 3.29 |
| d25 | 24.06 | 9.74 | 2.55 |
| d38 | 20.00 | 20.00 | 20.00 |
| d40 | 27.20 | 27.20 | 27.20 |

| LENS UNIT DATA | | |
|---|---|---|
| Lens Unit | Starting Surface | Focal Length |
| 1 | 1 | 49.67 |
| 2 | 14 | −38.92 |
| 3 | 21 | −265.77 |
| 4 | 23 | 73.00 |
| 5 | 26 | 90.05 |
| 6 | 39 | ∞ |

NUMERICAL EXAMPLE 4
UNIT: mm

SURFACE DATA

| Surface No. | r | d | nd | νd | θgF |
|---|---|---|---|---|---|
| 1* | 140.631 | 2.50 | 1.78800 | 47.4 | 0.5559 |
| 2 | 32.127 | 22.27 | | | |
| 3 | −100.348 | 1.80 | 1.76385 | 48.5 | 0.5589 |
| 4 | 63.071 | 14.38 | | | |
| 5 | 102.236 | 6.66 | 1.84666 | 23.8 | 0.6205 |
| 6 | −683.650 | 1.50 | | | |
| 7 | −712.237 | 6.88 | 1.49700 | 81.5 | 0.5375 |
| 8 | −85.591 | 12.43 | | | |
| 9 | 100.739 | 1.70 | 1.84666 | 23.8 | 0.6205 |
| 10 | 45.367 | 14.71 | 1.49700 | 81.5 | 0.5375 |
| 11 | −71.355 | 0.20 | | | |
| 12 | 67.922 | 4.78 | 1.61800 | 63.3 | 0.5426 |
| 13 | 174.918 | (Variable) | | | |
| 14 | 142.466 | 1.10 | 1.60300 | 65.4 | 0.5401 |
| 15 | 51.304 | 2.19 | | | |
| 16 | 130.629 | 1.10 | 1.80400 | 46.5 | 0.5577 |
| 17 | 26.164 | 3.74 | 1.77830 | 23.9 | 0.6248 |
| 18 | 60.029 | 5.22 | | | |
| 19 | −41.502 | 1.10 | 1.76385 | 48.5 | 0.5589 |
| 20 | −90.207 | (Variable) | | | |
| 21 (SP) | ∞ | 2.50 | | | |
| 22 | −133.987 | 1.40 | 1.43875 | 94.7 | 0.5340 |
| 23 | 315.711 | (Variable) | | | |
| 24 | 45.595 | 4.14 | 1.79952 | 42.2 | 0.5675 |
| 25* | 322.587 | (Variable) | | | |
| 26 | 58.226 | 4.31 | 1.55200 | 70.7 | 0.5421 |
| 27 | −502.728 | 3.50 | | | |
| 28 | 84.037 | 1.20 | 2.00100 | 29.1 | 0.5997 |
| 29 | 33.108 | 9.61 | 1.43875 | 94.7 | 0.5340 |
| 30 | −47.530 | 0.45 | | | |
| 31 | 66.004 | 8.40 | 1.80810 | 22.8 | 0.6307 |

-continued

NUMERICAL EXAMPLE 4
UNIT: mm

| | | | | | |
|---|---|---|---|---|---|
| 32 | −37.368 | 1.20 | 2.00100 | 29.1 | 0.5997 |
| 33 | 281.976 | 0.20 | | | |
| 34 | 64.942 | 1.10 | 2.00100 | 29.1 | 0.5997 |
| 35 | 22.286 | 5.63 | 1.49700 | 81.5 | 0.5375 |
| 36 | 47.955 | 2.10 | | | |
| 37 | 32.521 | 4.36 | 1.49700 | 81.5 | 0.5375 |
| 38 | 65.368 | (Variable) | | | |
| 39 | ∞ | 2.80 | 1.51633 | 64.1 | 0.5353 |
| 40 | ∞ | (Variable) | | | |
| Image Plane | ∞ | | | | |

ASPHERIC DATA

1st Surface
K = 0.00000e+00 A 4 = 1.46115e−06 A 6 = 9.22179e−10
A 8 = −2.83217e−12 A10 = 4.02836e−15 A12 = −3.14659e−18
A14 = 1.30010e−21 A16 = − 2.20972e−25
25th Surface
K = 0.00000e+00 A 4 = 3.51579e−06 A 6 = 2.91886e−10
A 8 = 1.72212e−13

VARIOUS DATA
ZOOM RATIO 2.50

| | WIDE | MIDDLE | TELE |
|---|---|---|---|
| Focal Length | 20.00 | 35.00 | 50.00 |
| Fno | 2.80 | 2.80 | 2.80 |
| Half Angle of View (°) | 49.24 | 33.54 | 24.89 |
| Image Height | 23.20 | 23.20 | 23.20 |
| Overall Lens Length | 255.42 | 255.42 | 255.42 |
| BF | 49.03 | 49.03 | 49.03 |
| d13 | 1.40 | 32.07 | 46.95 |
| d20 | 27.55 | 2.50 | 1.30 |
| d23 | 3.22 | 9.07 | 1.30 |
| d25 | 19.88 | 8.41 | 2.50 |
| d38 | 20.00 | 20.00 | 20.00 |
| d40 | 27.18 | 27.18 | 27.18 |

LENS UNIT DATA

| Lens Unit | Starting Surface | Focal Length |
|---|---|---|
| 1 | 1 | 46.50 |
| 2 | 14 | −38.13 |
| 3 | 21 | −213.65 |
| 4 | 24 | 65.61 |
| 5 | 26 | 85.58 |
| 6 | 39 | ∞ |

NUMERICAL EXAMPLE 5
UNIT: mm

SURFACE DATA

| Surface No. | r | d | nd | νd | θgF |
|---|---|---|---|---|---|
| 1 | ∞ | 6.08 | 1.58313 | 59.4 | 0.5434 |
| 2 | −252.578 | 0.20 | | | |
| 3 | −1373.552 | 2.90 | 1.64000 | 60.1 | 0.5370 |
| 4 | 134.783 | 27.92 | | | |
| 5 | −122.271 | 2.30 | 1.64000 | 60.1 | 0.5370 |
| 6 | 122.968 | 4.78 | 1.84666 | 23.8 | 0.6205 |
| 7 | 301.282 | 3.89 | | | |
| 8 | 475.195 | 8.59 | 1.49700 | 81.5 | 0.5375 |
| 9 | −117.444 | 0.30 | | | |
| 10 | 185.531 | 2.30 | 1.84666 | 23.8 | 0.6205 |
| 11 | 82.989 | 12.19 | 1.49700 | 81.5 | 0.5375 |
| 12 | −213.462 | 0.20 | | | |

-continued

NUMERICAL EXAMPLE 5
UNIT: mm

| | | | | | |
|---|---|---|---|---|---|
| 13 | 78.100 | 8.49 | 1.72916 | 54.7 | 0.5444 |
| 14 | 352.078 | (Variable) | | | |
| 15 | 767.929 | 1.30 | 1.53775 | 74.7 | 0.5392 |
| 16 | 42.423 | 4.77 | | | |
| 17 | −526.368 | 1.20 | 1.61340 | 44.3 | 0.5633 |
| 18 | 47.303 | 3.84 | 1.84666 | 23.8 | 0.6205 |
| 19 | 132.805 | 4.98 | | | |
| 20 | −58.327 | 1.30 | 1.69680 | 55.5 | 0.5434 |
| 21 | −210.627 | (Variable) | | | |
| 22 | −75.234 | 1.40 | 1.43875 | 94.7 | 0.5340 |
| 23 | 842.023 | (Variable) | | | |
| 24 (SP) | ∞ | 3.77 | | | |
| 25 | 74.284 | 5.74 | 1.90525 | 35.0 | 0.5848 |
| 26* | −485.693 | (Variable) | | | |
| 27 | 55.529 | 7.18 | 1.72916 | 54.7 | 0.5444 |
| 28 | −807.003 | 0.67 | | | |
| 29 | 119.770 | 2.00 | 1.85478 | 24.8 | 0.6122 |
| 30 | 30.269 | 12.09 | 1.43875 | 94.7 | 0.5340 |
| 31 | −137.180 | 6.24 | | | |
| 32 | 386.578 | 9.05 | 1.60311 | 60.6 | 0.5415 |
| 33 | −36.786 | 1.50 | 1.85025 | 30.1 | 0.5979 |
| 34 | −146.068 | 0.56 | | | |
| 35 | 100.272 | 9.04 | 1.89286 | 20.4 | 0.6393 |
| 36 | −34.502 | 1.40 | 1.85025 | 30.1 | 0.5979 |
| 37 | 41.026 | 8.30 | | | |
| 38 | 107.432 | 2.58 | 1.83481 | 42.7 | 0.5648 |
| 39 | 2158.270 | (Variable) | | | |
| 40 | ∞ | 2.80 | 1.51633 | 64.1 | 0.5353 |
| 41 | ∞ | (Variable) | | | |
| Image Plane | ∞ | | | | |

ASPHERIC DATA

26th Surface
K = 0.00000e+00 A 4 = 1.31931e−06 A 6 = −1.58495e−11
A 8 = −3.48044e−14

VARIOUS DATA
ZOOM RATIO 2.91

| | WIDE | MIDDLE | TELE |
|---|---|---|---|
| Focal Length | 45.00 | 85.00 | 131.00 |
| Fno | 2.30 | 2.30 | 2.30 |
| Half Angle of View (°) | 27.27 | 15.27 | 10.04 |
| Image Height | 23.20 | 23.20 | 23.20 |
| Overall Lens Length | 289.08 | 289.08 | 289.08 |
| BF | 51.84 | 51.84 | 51.84 |
| d14 | 4.23 | 40.23 | 59.21 |
| d21 | 40.95 | 7.56 | 4.59 |
| d23 | 3.42 | 10.41 | 2.88 |
| d26 | 19.58 | 9.98 | 1.50 |
| d39 | 20.00 | 20.00 | 20.00 |
| d41 | 30.00 | 30.00 | 30.00 |

LENS UNIT DATA

| Lens Unit | Starting Surface | Focal Length |
|---|---|---|
| 1 | 1 | 115.17 |
| 2 | 15 | −40.32 |
| 3 | 22 | −156.94 |
| 4 | 24 | 71.04 |
| 5 | 27 | 101.05 |
| 6 | 40 | ∞ |

TABLE 1

| | Ex. 1 | Ex. 2 | Ex. 3 | Ex. 4 | Ex. 5 |
|---|---|---|---|---|---|
| (1) vd21 | 81.5 | 60.5 | 94.7 | 65.4 | 74.7 |
| (2) vd2Nave | 45.6 | 46.95 | 41.75 | 47.5 | 49.9 |
| (3) θgF21 + 0.001 × vd21 − 0.603 | 0.0160 | 0.0125 | 0.0257 | 0.0025 | 0.0109 |
| (4) f21/f2 | 2.78 | 2.43 | 2.88 | 3.49 | 2.07 |
| (5) vd2Pmin | 22.80 | 23.80 | 22.80 | 23.90 | 23.80 |
| θgF21 | 0.5375 | 0.5550 | 0.5340 | 0.5401 | 0.5392 |
| f2 | −38.73 | −38.46 | −38.92 | −38.13 | −40.32 |
| f21 | −107.54 | −93.63 | −112.18 | −133.09 | −83.29 |

FIG. 16 illustrates the configuration of an imaging system 125 using the zoom lens according to any one of Examples 1 to 5 as an imaging optical system. Reference numeral 101 denotes the zoom lens according to any one according to Examples 1 to 5. Reference numeral 124 denotes a camera body serving as an image pickup apparatus. The zoom lens 101 is attachable to and detachable (interchangeable) from the camera body 124.

The zoom lens 101 includes a first lens unit F, a zoom unit LZ, and an imaging lens unit R. As described according to Examples 1 to 3, the first lens unit F includes the first and third sub-lens units that are fixed for focusing and the second sub-lens unit that moves for focusing. The zoom unit LZ includes at least three moving units that move during zooming. An aperture stop SP is disposed between the zoom unit LZ and the imaging lens unit R. The zoom lens 101 includes driving mechanisms 114 and 115 such as helicoids and cams that drive the second sub-lens unit, and the zoom unit LZ in the optical axis direction.

The zoom lens 101 further includes electric actuators (motors, etc.) 116, 117, and 118 that drive the driving mechanisms 114 and 115 and the aperture stop SP, and a control unit 122 that controls them. The positions of the second sub-lens unit and the lens units in the zoom unit LZ and the aperture diameter of the aperture stop SP are detected by detectors 119, 120, and 121 such as encoders, potentiometers, or photosensors, and controlled by the control unit 122 according to these detection results.

The camera body 124 includes a glass block 109 such as an optical filter, and a solid-state image sensor 110 such as a CCD sensor or CMOS sensor that captures an object image formed by the zoom lens 101 (captures an object via the imaging optical system).

Imaging using the zoom lens according to each example in this way can provide an excellent captured image.

While the disclosure has described example embodiments, it is to be understood that some embodiments are not limited to the disclosed embodiments. The scope of the following claims is to be accorded the broadest interpretation so as to encompass all such modifications and equivalent structures and functions.

Each example can provide a zoom lens that is beneficial, for example, to a reduced size and weight, a high specification, and high optical performance over the entire zoom range.

What is claimed is:

1. A zoom lens comprising, in order from an object side to an image side:

a first lens unit having positive refractive power and fixed for zooming;

a second lens unit having negative refractive power and configured to move during zooming;

at least two lens units configured to move during zooming;

a final lens unit having positive refractive power, disposed closest to an image plane, and fixed for zooming; and an aperture stop disposed between a lens surface closest to the image plane of the second lens unit and a lens surface closest to an object of the final lens unit, configured to move during zooming, and located closer to the image plane at a telephoto end than at a wide-angle end, wherein the first lens unit includes a sub-lens unit disposed closest to the object in the first lens unit and fixed for focusing, and a sub-lens unit configured to move for focusing, wherein the second lens unit includes a first negative lens closest to the object in the second lens unit, at least one negative lens other than the first negative lens, and at least one positive lens, and wherein the following inequalities are satisfied:

$$60 \le vd21 \le 105$$

$$30 \le vd2Nave \le 65$$

$$1.5 \le f21/f2 \le 5.0$$

where $vd21$ is an Abbe number of a material of the first negative lens based on d-line, $vd2Nave$ is an average Abbe number of a material of the at least one negative lens other than the first negative lens in the second lens unit, and f21 is a focal length of the first negative lens, and f2 is a focal length of the second lens unit.

2. The zoom lens according to claim 1, wherein the following inequality is satisfied:

$$0 < \theta gF21 + 0.001 \times vd21 - 0.603$$

where $\theta gF21$ is a partial dispersion ratio for g-line and F-line of the material of the first negative lens.

3. The zoom lens according to claim 1, wherein the second lens unit includes at least three negative lenses including the first negative lens.

4. The zoom lens according to claim 1, wherein the first negative lens is a single lens.

5. The zoom lens according to claim 1, wherein the following inequality is satisfied:

$$vd2P\min \le 28$$

where $vd2P\min$ is a minimum Abbe number among Abbe numbers based on the d-line of a material of the at least one positive lens of the second lens unit.

6. The zoom lens according to claim 1, wherein the first lens unit includes, in order from the object side to the image side, a first sub-lens unit fixed for focusing, a second sub-lens unit configured to move for focusing, and a third sub-lens unit fixed for focusing.

7. A zoom lens comprising, in order from an object side to an image side:

a first lens unit having positive refractive power and fixed for zooming;

a second lens unit having negative refractive power and configured to move during zooming;

at least two lens units configured to move during zooming;

a final lens unit having positive refractive power, disposed closest to an image plane, and fixed for zooming; and an aperture stop disposed between a lens surface closest to the image plane of the second lens unit and a lens surface closest to an object of the final lens unit, configured to move during zooming, and located closer to the image plane at a telephoto end than at a wide-angle end, wherein the first lens unit includes a sub-lens unit disposed closest to the object in the first lens unit and fixed for focusing, and a sub-lens unit configured to move for focusing, wherein the second lens unit includes a first negative lens closest to the object in the second lens unit, at least one negative lens other than the first negative lens, and at least one positive lens, wherein the at least two lens units configured to move during zooming include, in order from the object side to the image side, a third lens unit having negative refractive power, and at least one lens unit, and wherein the following inequalities are satisfied:

$$60 \leq \nu d21 \leq 105$$

$$30 \leq \nu d2Nave \leq 65$$

where νd21 is an Abbe number of a material of the first negative lens based on d-line, and νd2Nave is an average Abbe number of a material of the at least one negative lens other than the first negative lens in the second lens unit.

8. A zoom lens comprising, in order from an object side to an image side:

a first lens unit having positive refractive power and fixed for zooming;

a second lens unit having negative refractive power and configured to move during zooming;

at least two lens units configured to move during zooming;

a final lens unit having positive refractive power, disposed closest to an image plane, and fixed for zooming; and an aperture stop disposed between a lens surface closest to the image plane of the second lens unit and a lens surface closest to an object of the final lens unit, configured to move during zooming, and located closer to the image plane at a telephoto end than at a wide-angle end, wherein the first lens unit includes a sub-lens unit disposed closest to the object in the first lens unit and fixed for focusing, and a sub-lens unit configured to move for focusing, wherein the second lens unit includes a first negative lens closest to the object in the second lens unit, at least one negative lens other than the first negative lens, and at least one positive lens, wherein the at least two lens units configured to move during zooming include, in order from the object side to the image side, a third lens unit having negative refractive power, and a fourth lens unit having positive refractive power, and wherein the following inequalities are satisfied:

$$60 \leq \nu d21 \leq 105$$

$$30 \leq \nu d2Nave \leq 65$$

where νd21 is an Abbe number of a material of the first negative lens based on d-line, and νd2Nave is an average Abbe number of a material of the at least one negative lens other than the first negative lens in the second lens unit.

9. A zoom lens comprising, in order from an object side to an image side:

a first lens unit having positive refractive power and fixed for zooming;

a second lens unit having negative refractive power and configured to move during zooming;

at least two lens units configured to move during zooming;

a final lens unit having positive refractive power, disposed closest to an image plane, and fixed for zooming; and an aperture stop disposed between a lens surface closest to the image plane of the second lens unit and a lens surface closest to an object of the final lens unit, configured to move during zooming, and located closer to the image plane at a telephoto end than at a wide-angle end, wherein the first lens unit includes a sub-lens unit disposed closest to the object in the first lens unit and fixed for focusing, and a sub-lens unit configured to move for focusing, wherein the second lens unit includes a first negative lens closest to the object in the second lens unit, at least one negative lens other than the first negative lens, and at least one positive lens, wherein the final lens unit is a fifth lens unit counted from the object side, and wherein the following inequalities are satisfied:

$$60 \leq \nu d21 \leq 105$$

$$30 \leq \nu d2Nave \leq 65$$

where νd21 is an Abbe number of a material of the first negative lens based on d-line, and νd2Nave is an average Abbe number of a material of the at least one negative lens other than the first negative lens in the second lens unit.

10. An image pickup apparatus comprising:

a zoom lens; and an image sensor configured to capture an image formed through the zoom lens, wherein a zoom lens includes, in order from an object side to an image side:

a first lens unit having positive refractive power and fixed for zooming;

a second lens unit having negative refractive power and configured to move during zooming;

at least two lens units configured to move during zooming;

a final lens unit having positive refractive power, disposed closest to an image plane, and fixed for zooming; and an aperture stop disposed between a lens surface closest to the image plane of the second lens unit and a lens surface closest to an object of the final lens unit, configured to move during zooming, and located closer to the image plane at a telephoto end than at a wide-angle end, wherein the first lens unit includes a sub-lens unit disposed closest to the object in the first lens unit and fixed for focusing, and a sub-lens unit configured to move for focusing, wherein the second lens unit includes a first negative lens closest to the object in the second lens unit, at least one negative lens other than the first negative lens, and at least one positive lens, and wherein the following inequalities are satisfied:

$$60 \leq \nu d21 \leq 105$$

$$30 \leq \nu d2Nave \leq 65$$

$$1.5 \leq f21/f2 \leq 5.0$$

where νd21 is an Abbe number of a material of the first negative lens based on d-line, νd2Nave is an average Abbe number of a material of the at least one negative lens other than the first negative lens in the second lens unit, and f21 is a focal length of the first negative lens, and f2 is a focal length of the second lens unit.

* * * * *